US012563053B2

(12) United States Patent
Bonev et al.

(10) Patent No.: US 12,563,053 B2
(45) Date of Patent: Feb. 24, 2026

(54) METHODS AND SYSTEMS FOR FRAUD DETECTION USING RELATIVE MOVEMENT OF FACIAL FEATURES

(71) Applicant: Onfido Ltd., London (GB)

(72) Inventors: Slavi Bonev, London (GB); Mohan Mahadevan, London (GB); Romain Sabathe, London (GB); Sébastien Ehrhardt, London (GB); Richard Tomsett, London (GB)

(73) Assignee: Onfido Ltd., London (GB)

( * ) Notice: Subject to any disclaimer, the term of this patent is extended or adjusted under 35 U.S.C. 154(b) by 342 days.

(21) Appl. No.: 18/081,119

(22) Filed: Dec. 14, 2022

(65) Prior Publication Data

US 2024/0205239 A1     Jun. 20, 2024

(51) Int. Cl.
| | |
|---|---|
| *H04L 9/40* | (2022.01) |
| *G06V 10/764* | (2022.01) |
| *G06V 10/94* | (2022.01) |
| *G06V 40/16* | (2022.01) |
| *G06V 40/18* | (2022.01) |
| *G06V 40/40* | (2022.01) |

(52) U.S. Cl.
CPC ........ *H04L 63/1416* (2013.01); *G06V 10/764* (2022.01); *G06V 10/95* (2022.01); *G06V 40/167* (2022.01); *G06V 40/171* (2022.01); *G06V 40/193* (2022.01); *G06V 40/45* (2022.01); *H04L 63/0861* (2013.01)

(58) Field of Classification Search
USPC ........................................................... 726/6
See application file for complete search history.

(56) References Cited

U.S. PATENT DOCUMENTS

| | | | | |
|---|---|---|---|---|
| 9,230,158 | B1 * | 1/2016 | Ramaswamy | ....... H04N 23/611 |
| 9,547,763 | B1 * | 1/2017 | Avital | ................. H04L 63/0861 |

(Continued)

FOREIGN PATENT DOCUMENTS

| | | | | |
|---|---|---|---|---|
| WO | WO-2021112849 A1 * | 6/2021 | ......... G06K 9/00228 |

OTHER PUBLICATIONS

Bazarevsky et al., "BlazeFace: Sub-millisecond Neural Face Detection on Mobile GPUs," CVPR Workshop on Computer Vision for Augmented and Virtual Reality, Long Beach, CA, USA, 2019 arXiv:1097.05047 [cs.CV], Jul. 14, 2019.

(Continued)

*Primary Examiner* — Kambiz Zand
*Assistant Examiner* — Mahabub S Ahmed
(74) *Attorney, Agent, or Firm* — Merchant & Gould P.C.

(57) ABSTRACT

Described herein are computerized methods and systems for detecting fraud during identity verification. An image capture device of a mobile device captures video comprising a plurality of frames of a person's face and transmits the plurality of frames to a server device. The server detects locations of rigid and non-rigid facial features of the person's face in each of the plurality of frames. The server generates time-series signals based upon a position measurement for the facial features in each of the plurality of frames and extracts classification features from the time-series signals. The server applies a trained machine learning classification model to the extracted classification features to generate a fraud detection decision for the plurality of frames.

46 Claims, 15 Drawing Sheets

200

(56) References Cited

U.S. PATENT DOCUMENTS

| | | | | |
|---|---|---|---|---|
| 9,665,715 | B1* | 5/2017 | Roundy | G06F 21/552 |
| 10,268,911 | B1* | 4/2019 | Wu | G06V 40/171 |
| 10,346,675 | B1* | 7/2019 | Nagalla | G06V 40/172 |
| 10,803,301 | B1* | 10/2020 | Farivar | G06V 40/172 |
| 10,825,564 | B1* | 11/2020 | Zhang | G06V 40/174 |
| 11,893,099 | B2* | 2/2024 | Ortiz | G06Q 20/4014 |
| 2007/0064978 | A1* | 3/2007 | Chhibber | G06V 10/143 |
| | | | | 382/118 |
| 2010/0086215 | A1* | 4/2010 | Bartlett | G06V 40/20 |
| | | | | 382/224 |
| 2013/0055399 | A1* | 2/2013 | Zaitsev | H04L 63/0263 |
| | | | | 726/25 |
| 2013/0305368 | A1* | 11/2013 | Ford | G06F 21/566 |
| | | | | 726/23 |
| 2016/0044054 | A1* | 2/2016 | Stiansen | H04L 63/1416 |
| | | | | 726/24 |
| 2016/0063314 | A1* | 3/2016 | Samet | G06F 21/31 |
| | | | | 348/78 |
| 2016/0234023 | A1* | 8/2016 | Mozer | G06V 40/168 |
| 2016/0342851 | A1* | 11/2016 | Holz | G06V 40/70 |
| 2017/0124385 | A1* | 5/2017 | Ganong | G06F 16/50 |
| 2017/0140211 | A1* | 5/2017 | Hayasaka | G06T 19/20 |
| 2017/0223046 | A1* | 8/2017 | Singh | H04L 63/1491 |
| 2018/0039745 | A1* | 2/2018 | Chevalier | G16H 50/20 |
| 2018/0089789 | A1* | 3/2018 | Derakhshani | G09C 5/00 |
| 2018/0236975 | A1* | 8/2018 | Myers | G06V 40/193 |
| 2018/0351968 | A1* | 12/2018 | MacLeod | G06F 21/568 |
| 2018/0357501 | A1* | 12/2018 | Ma | G06V 10/764 |
| 2019/0065833 | A1* | 2/2019 | Wang | G06V 20/46 |
| 2019/0095737 | A1* | 3/2019 | Hecker | G06V 40/162 |
| 2019/0109849 | A1* | 4/2019 | Frempong | H04L 63/105 |
| 2019/0173909 | A1* | 6/2019 | Mixer | H04L 41/082 |
| 2019/0190936 | A1* | 6/2019 | Thomas | H04L 51/212 |
| 2019/0244390 | A1* | 8/2019 | Doublet | G06F 21/32 |
| 2019/0260795 | A1* | 8/2019 | Araiza | H04L 43/045 |
| 2019/0342329 | A1* | 11/2019 | Turgeman | G06F 3/0488 |
| 2019/0385057 | A1* | 12/2019 | Litichever | G06N 3/08 |
| 2020/0036528 | A1* | 1/2020 | Ortiz | G06N 3/0464 |
| 2020/0143148 | A1* | 5/2020 | Sobh | G06V 10/95 |
| 2020/0184212 | A1* | 6/2020 | Anthony Samy | G06N 3/0895 |
| 2020/0193281 | A1* | 6/2020 | Wilfred | G06N 3/09 |
| 2020/0218885 | A1* | 7/2020 | Budhrani | G06V 40/45 |
| 2020/0244673 | A1* | 7/2020 | Stockdale | H04L 63/1433 |
| 2020/0296132 | A1* | 9/2020 | Lv | H04L 63/1483 |
| 2020/0302058 | A1* | 9/2020 | Kenyon | G06F 21/554 |
| 2020/0304528 | A1* | 9/2020 | Ackerman | G06F 18/23213 |
| 2020/0336503 | A1* | 10/2020 | Xu | G06F 11/0772 |
| 2021/0073518 | A1* | 3/2021 | Kumar | G06V 40/167 |
| 2021/0097540 | A1* | 4/2021 | Sumpter | G07F 19/207 |
| 2021/0117987 | A1* | 4/2021 | Nakazawa | G06T 7/00 |
| 2021/0174068 | A1* | 6/2021 | Kao | G06V 10/145 |
| 2021/0200593 | A1* | 7/2021 | Allyn | G06F 9/5022 |
| 2021/0273961 | A1* | 9/2021 | Humphrey | H04L 63/1433 |
| 2021/0334581 | A1* | 10/2021 | Gandara | G06F 18/253 |
| 2021/0360027 | A1* | 11/2021 | Boyer | H04L 51/212 |
| 2021/0400071 | A1* | 12/2021 | Ray | H04L 63/1441 |
| 2022/0019771 | A1* | 1/2022 | Matsunami | G06V 40/161 |
| 2022/0050890 | A1* | 2/2022 | Karantzis | H04L 63/0861 |
| 2022/0121884 | A1* | 4/2022 | Zadeh | G06N 3/006 |
| 2022/0392047 | A1* | 12/2022 | Wheaton | G06V 10/40 |
| 2022/0398827 | A1* | 12/2022 | Lewis | G06F 16/90332 |
| 2023/0012220 | A1* | 1/2023 | Humphrey | G06F 21/53 |
| 2023/0060732 | A1* | 3/2023 | Zhang | G06V 10/82 |
| 2023/0095182 | A1* | 3/2023 | Yao | G06V 40/40 |
| | | | | 382/115 |
| 2023/0140194 | A1* | 5/2023 | Kadry | G06Q 50/265 |
| | | | | 705/7.15 |
| 2023/0147685 | A1* | 5/2023 | Koch | G06V 30/147 |
| | | | | 382/103 |
| 2023/0252863 | A1* | 8/2023 | Sumpter | G07F 19/2055 |
| | | | | 705/43 |
| 2024/0021020 | A1* | 1/2024 | Shekhar | G06V 10/82 |
| 2024/0046074 | A1* | 2/2024 | Lewis | G06V 10/764 |
| 2024/0070251 | A1* | 2/2024 | Maizels | G10L 13/02 |
| 2024/0073219 | A1* | 2/2024 | Maizels | G10L 17/10 |
| 2024/0177519 | A1* | 5/2024 | Singh | G06V 10/761 |
| 2024/0205256 | A1* | 6/2024 | Tormasov | H04L 63/1425 |
| 2024/0223596 | A1* | 7/2024 | Sellars | H04L 63/1433 |
| 2024/0304032 | A1* | 9/2024 | Meroni | G06V 40/171 |
| 2024/0348603 | A1* | 10/2024 | Tussy | G06V 40/167 |
| 2025/0078567 | A1* | 3/2025 | Schillen | G06V 40/172 |

OTHER PUBLICATIONS google.github.io/mediapipe/solutions/face_detection, downloaded Mar. 25, 2025.

google.github.io/mediapipe/solutions/face_mesh, downloaded Mar. 25, 2025.

E. Arcoverde et al., "Enhanced real-time head pose estimation system for mobile device," Integrated Computer Aided Engineering 21(3):281-2, Apr. 2014.

J. Canny, "A Computational Approach to Edge Detection," IEEE Transactions on Pattern Analysis and Machine Intelligence (vol. PAMI-8, Issue: 6, Nov. 1986).

D. Patel & S. Upadhyay, "Optical Flow Measurement using Lucas Kanade Method," International Journal of Computer Applications (0975-8887), vol. 61, No. 10, Jan. 2013.

Norn, Berthold K.P. and Brian G. Schunck, "Determining Optical Flow," Artificial Intelligence, 17(1-3):185-203, Aug. 1981.

G.M. Ljung & G.E.P. Box, "On a measure of lack of fit in time series models," Biometrika, vol. 65, Issue 2, Aug. 1978, pp. 297-303.

Kollreider et al., "Real-Time Face Detection and Motion Analysis With Application in Liveness Assessment," IEEE Transactions on Information Forensics and Security, vol. 2, No. 3, Sep. 2007, pp. 548-558.

Hesse et al., "Multi-view Facial Expression Recognition using Local Appearance Features," 21st International Conference on Pattern Recognition (ICPR 2012) Nov. 11-15, 2012. Tsukuba, Japan, pp. 3533-3536.

Ali et al., "Directional Sensitivity of Gaze-Collinearity Features in Liveness Detection," University of Kent, Canterbury, Kent, CT2 7NT, United Kingdom, 2013 Fourth International Conference on Emerging Security Technologies. pp. 8-11.

Wang et al., "Face Liveness Detection Using 3D Structure Recovered from a Single Camera," Center for Biometrics and Security Research & National Laboratory of Pattern Recognition Institute of Automation, Chinese Academy of Sciences, China, 2013, 6 pages.

Kaehm et al, "2D Face Liveness Detection: an Overview," Competence Center Identification and Biometrics Fraunhofer Institute for Computer Graphics Research IGD Fraunhoferstraße 5 64283 Darmstadt, Germany, 2014, pp. 171-182.

Happy et al. "Automatic Facial Expression Recognition Using Features of Salient Facial Patches," 2015, 13 pages.

Melnikov et al., "Audiovisual Liveness Detection," Springer International Publishing Switzerland 2015: ICIAP 2015, Part II, LNCS 9280, pp. 643-652.

Davison et al., ""Objective Classes for Micro-FacialExpression Recognition,"" Journal of Imaging, 4, 19, Oct. 15, 2018, 13 pages.

Davison et al., ""SAMM: A SpontaneousMicro-Facial Movement Dataset,"" IEEE Transactions on Affective Computing, vol. 9, No. 1, Jan.-Mar. 2018, pp. 116-128.

Munasinghe, Nuwan, "Facial Expression Recognition Using Facial Landmarks and Random ForestClassifier," University of Technology Sydney, Conference Paper • Jun. 2018DOI: 10.1109/ICIS.2018. 8466510, 6 pages.

Hasan et al., ""Efficient two stage approach to detect face liveness :Motion based and Deep learning based,"" 4th International Conference on Electrical Information and Communication Technology (EICT), Dec. 20-22, 2019, Khulna, Bangladesh, 7 pages.

Li et al., "A Closer Look Tells More: A Facial Distortion Based Liveness Detection for Face Authentication," Asia CCS '19: Proceedings of the 2019 ACM Asia Conference on Computer and Communications Security, Jul. 2019, pp. 241-246.

Nishanth et al., "Liveness Detection Based on Human eye Blinking for Photo Attacks," International Journal of Engineering and Advanced Technology (IJEAT) ISSN: 2249-8958, vol. 9 Issue-1, Oct. 2019, pp. 4074-4077.

(56) References Cited

OTHER PUBLICATIONS

Qiu et al., "Facial Expression Recognition based on Landmarks," 2019 IEEE 4th Advanced Information Technology Electronic and Automation Control Conference (IAEAC), pp. 1356-1360.

Zhao et al., "Automatic Micro-Expression Analysis: Open Challenges," Frontiers in Psychology, Aug. 2019, vol. 10, Article 1833, 4 pages.

Khan, Fuzail, ""Facial Expression Recognition using Facial-Landmark Detection and Feature Extraction viaNeural Networks,"" National Institute of Technology Karnataka, SurathkalMangalore, India, 2020, 7 pages.

Rizwan, et al., "An Accurate Facial Expression Detector using Multi-Landmarks Selection and Local Transform Features," DOI: 10.1109/ICACS47775.2020.9055954, Conference Paper • Jan. 2020, 7 pages.

Kumar, et al., "Micro-Expression Classification based on Landmark Relations with Graph Attention Convolutional Network," Department of Electrical and Computer Engineering, University of California, Riverside, 2021, 10 pages.

Nanthini et al., ""An Efficient Velocity Estimation Approachfor Face Liveness Detection usingTechnique,"" IndianJournal of Science and Technology 14(25): 2128-2136.

* cited by examiner

100

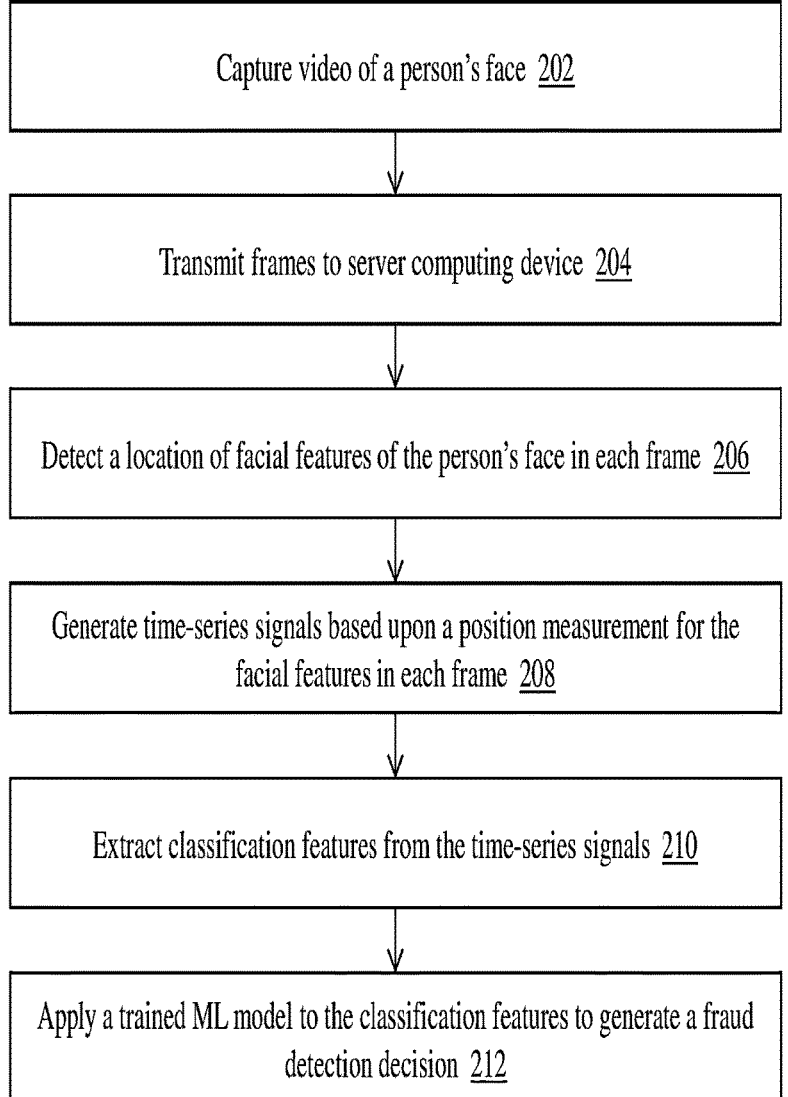

Capture video of a person's face  202

Transmit frames to server computing device  204

Detect a location of facial features of the person's face in each frame  206

Generate time-series signals based upon a position measurement for the facial features in each frame  208

Extract classification features from the time-series signals  210

Apply a trained ML model to the classification features to generate a fraud detection decision  212

```
frame_list = list of frames, each frame containing detected landmarks with x and y coordinates
n_rigid = number of rigid landmarks
n_nonrigid = number of non-rigid landmarks
x_signals = 2d-array of shape (n_non_rigid * n_rigid, n_frames)
y_signals = 2d-array of shape (n_non_rigid * n_rigid, n_frames)
for frame_index = 0:n_frames-1 {
    frame = frame_list[idx]
    for rigid_lm_index = 0:n_rigid {
        for nonrigid_lm_index = 0:n_nonrigid {
            relative_x = frame.landmarks[nonrigid_lm_index].x - frame.landmarks[rigid_lm_index].x
            relative_y = frame.landmarks[nonrigid_lm_index].y - frame.landmarks[rigid_lm_index].y
            x_signals[(rigid_lm_index * n_rigid) + nonrigid_lm_index, frame_index] = relative_x
            y_signals[(rigid_lm_index * n_rigid) + nonrigid_lm_index, frame_index] = relative_y
        }
    }
}
```

```
frame_list = list of frames, each frame containing detected landmarks with x and y coordinates
edge_image_list = list of edge-intensity-images derived from frame_list
n_rigid = number of rigid landmarks
n_nonrigid = number of non-rigid landmarks
intensity_signals = 2d-array of shape (n_non_rigid * n_rigid, n_frames)
for frame_index = 0:n_frames-1 {
    frame = frame_list[idx]
    edge_image = edge_image_list[idx]
    for rigid_lm_index = 0:n_rigid {
        for nonrigid_lm_index = 0:n_nonrigid {
            nonrigid_x, nonrigid_y = frame.landmarks[nonrigid_lm_index].x, frame.landmarks[nonrigid_lm_index].y
            rigid_x, rigid_y = frame.landmarks[rigid_lm_index].x, frame.landmarks[rigid_lm_index].y
            nonrigid_intensity = surrounding_pixel_intensity(edge_image, nonrigid_x, nonrigid_y)
            rigid_intensity = surrounding_pixel_intensity(edge_image, rigid_x, rigid_y)
            relative_intensity = nonrigid_intensity / rigid_intensity
            intensity_signals[(rigid_lm_index * n_rigid) + nonrigid_lm_index, frame_index] = relative_intensity
        }
    }
}
```

1. selfie-video
capture starts
2. stimulus
displayed
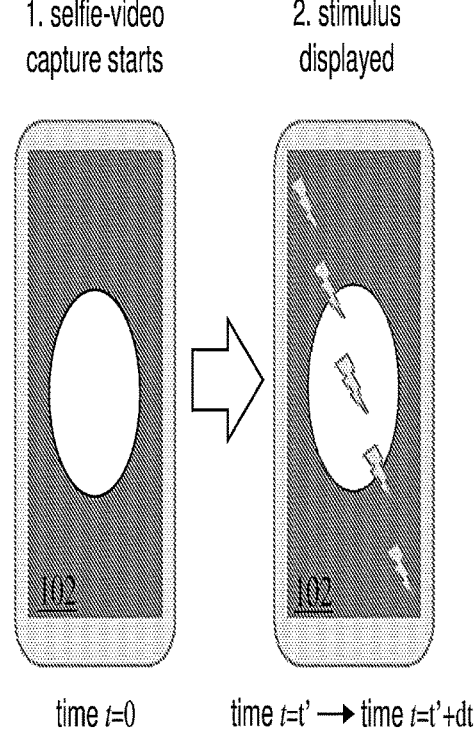
time $t=0$     time $t=t'$ → time $t=t'+dt$
702
704
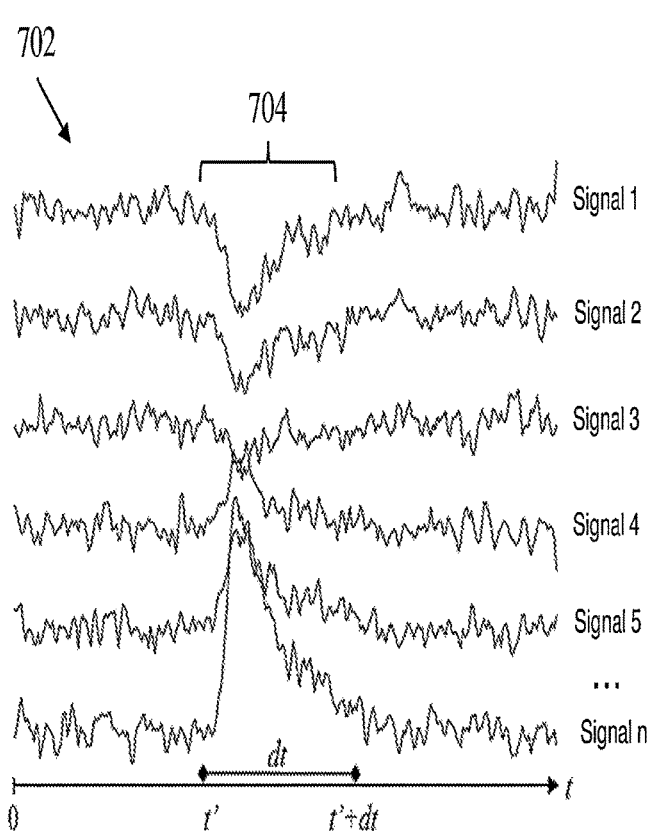
Signal 1
Signal 2
Signal 3
Signal 4
Signal 5
...
Signal n
$dt$
$0$     $t'$     $t'+dt$     $t$
700
FIG. 7

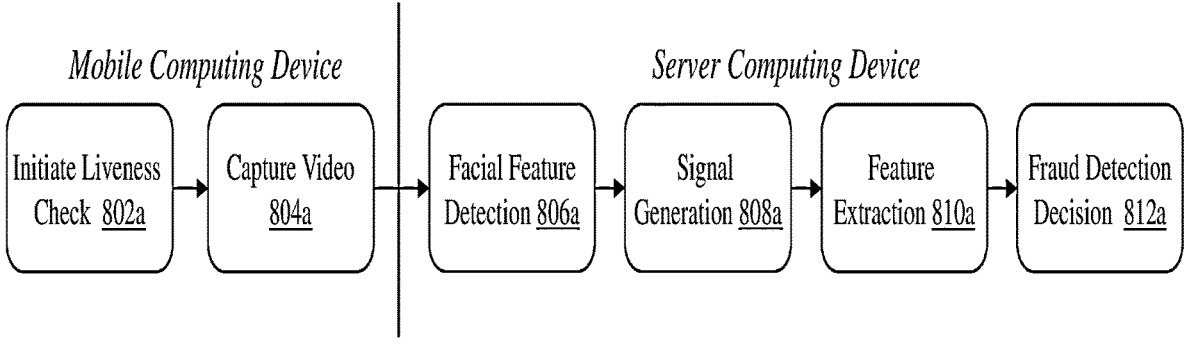

*Mobile Computing Device*    *Server Computing Device*

Initiate Liveness Check 802a → Capture Video 804a → Facial Feature Detection 806a → Signal Generation 808a → Feature Extraction 810a → Fraud Detection Decision 812a

FIG. 8A

*Mobile Computing Device*    *Server Computing Device*

Initiate Liveness Check 802b → Capture Video 804b → Facial Feature Detection 806b → Signal Generation 808b → Feature Extraction 810b → Fraud Detection Decision 812b

FIG. 8B

Server Computing
Device

Mobile Computing Device

Mobile Computing Device

METHODS AND SYSTEMS FOR FRAUD DETECTION USING RELATIVE MOVEMENT OF FACIAL FEATURES

TECHNICAL FIELD

The subject matter of the application relates generally to methods and systems for detecting fraud during identity verification, including but not limited to measuring and analyzing relative movement of a person's facial features to determine whether the person is genuine or fraudulent value during a remote identity verification process.

BACKGROUND

Remote identity verification processes are typically conducted between a first user at a computing device (e.g., a mobile device like a smartphone) and a verification authority (which can be a second user operating a remote computing device or an automated remote computing device), where the verification authority seeks to validate the identity of the first user. Typically, such verification processes rely on the first user capturing video of their face that is then processed and analyzed by the verification authority. As part of this process, it is important to confirm that the face of the first user is a genuine, live human face, and not a simulated or spoofed representation-such as a two-dimensional printout of the person's face, a person wearing a latex mask, a picture of another person's face, a video recording of a person's face, or a digital recreation of a face—while also addressing the need to keep the user experience simple and intuitive so that users do not drop off or avoid using the verification workflow.

Existing liveness detection techniques suffer from several drawbacks. Such techniques may rely on specialized equipment like complex, expensive cameras or computing hardware to record high-quality video and generate a 3D reconstruction of a person's face from the video. In addition, these systems may require a user to perform complicated, movement-intensive actions with their face and/or the mobile device to capture sufficient video frames so that a fraud detection decision can be rendered. Other systems rely upon a single image or video of a frontal-facing face. Those systems lack the necessary signals to be able to robustly distinguish between genuine faces and sophisticated 3D attacks.

SUMMARY

Therefore, what is needed are methods and systems for automatically and dynamically assessing the genuineness of a person depicted in a video captured by a mobile computing device using advanced machine learning facial analysis and fraud detection techniques. The techniques described herein beneficially detect spatio-temporal features of a person's face, obtained from video of a person's face captured by a mobile computing device (e.g., laptop or smartphone) as input for analysis in order to classify the face as genuine or fraudulent.

In addition, the systems and methods described herein enable the generation of direct signals representing the relative movement of facial features to establish the "liveness" of a person in a video. This dramatically increases the difficulty of creating a spoof video, because a spoof must recreate patterns of relative motion in the facial features that are similar to those of a real human face. This is extremely difficult, especially for printed spoofs or static images, which cannot move in the same way as a real face. As a result, one benefit of the techniques described herein are improved performance in detecting these kinds of printed spoof attempts in particular.

Previous approaches have considered non-rigid facial motion signals for detecting spoofs, but often required specific user interactions with the system (e.g., asking the person to smile). The present systems and methods do not require these types of interactions but can include them as an optional feature. The systems and methods also solve a drawback of existing fraud detection systems which conflate general motion within the video with specific facial non-rigid motion. Furthermore, the time-series signals generated by the system can be adapted to work with a variety of different user experiences. For example, the user may be asked to stay still during video capture (passive), or to move their head or facial features in a particular pattern (active). This invention allows equivalent signals to be extracted and used under both passive and active video capture modes, increasing its versatility. Previous methods that look at non-rigid motion either require active user participation to generate the signals (e.g., requiring them to speak) or look for signals that are not guaranteed to be generated during a short video capture (such as blinking). The methods and systems described herein focus on facial movements that occur naturally without requiring user participation or prompting.

Beneficially, the methods and systems allow for a rapid fraud detection decision via mobile device that is robust to various types of spoofing and other fraud attempts that existing facial analysis techniques cannot accurately detect—e.g., spoofing attempts using 2D images or a recorded video of a person's face, use of latex masks with realistic features but lacking human textures, or eye cut outs. In addition, the methods and systems of the present technology provide for minimal interaction and motion of the end user-thereby providing an intuitive user experience that maintains user engagement-while also enabling a robust solution to the most common types of facial biometrics attacks. Live feedback from the end user's device enables the system to assess with certainty the presence of a genuine human face behind the camera used for recording, while minimizing the amount of motion required by the user. Advantageously, the system enables capture of videos using common consumer devices (e.g., smartphones) instead of requiring specific hardware. In particular, it allows the use of relatively short videos (e.g., 1.5 to 15 seconds) captured at relatively low resolution and bitrate to be used. As such, the systems can be used in large scale remote identity verification processes. Also, as mentioned above, a single-frame-based solution will eventually reach its limits when faced with a difficult fraud. The techniques presented herein avoid this limitation and provide increased protection through the use of video.

The invention, in one aspect, features a computer system for detecting fraud during identity verification. The system comprises a mobile computing device coupled to an image capture device and a server computing device. The mobile computing device captures, using the image capture device, video comprising a plurality of frames of a person's face. The mobile computing device transmits the plurality of frames to the server computing device. The server computing device detects a location of one or more facial features of the person's face in each of the plurality of frames, wherein the facial features comprise rigid facial features and non-rigid facial features. The server computing device generates a plurality of time-series signals based upon a position measurement for the facial features in each of the plurality of frames. The server computing device extracts one or more classification features from the plurality of time-series signals. The server computing device applies a trained machine learning classification model to the extracted classification features to generate a fraud detection decision for the plurality of frames.

The invention, in another aspect, features a computerized method of detecting fraud during identity verification. A mobile computing device captures, using an image capture device, video comprising a plurality of frames of a person's face. The mobile computing device transmits the plurality of frames to a server computing device. The server computing device detects a location of one or more facial features of the person's face in each of the plurality of frames, wherein the facial features comprise rigid facial features and non-rigid facial features. The server computing device generates a plurality of time-series signals based upon a position measurement for the facial features in each of the plurality of frames. The server computing device extracts one or more classification features from the plurality of time-series signals. The server computing device applies a trained machine learning classification model to the extracted classification features to generate a fraud detection decision for the plurality of frames.

Any of the above aspects can include one or more of the following features. In some embodiments, the mobile computing device transmits the plurality of frames to the server computing device upon determining that a threshold number of frames contain the person's face. In some embodiments, the server computing device applies a facial landmark regression algorithm to each of the plurality of frames to detect the location of the one or more facial features of the person's face. In some embodiments, the non-rigid facial features comprise irises, eyelids, eyebrows, eye corners, and mouth. In some embodiments, the rigid facial features comprise face outline and nose.

In some embodiments, generating a plurality of time-series signals based upon a position measurement for the facial features in each of the plurality of frames comprises calculating a relative position between the location of each non-rigid facial feature and the location of one or more of the rigid facial features across the plurality of frames, and generating the plurality of time-series signals based upon the relative positions.

In some embodiments, generating a plurality of time-series signals based upon a position measurement for the facial features in each of the plurality of frames comprises generating an edge image for each of the plurality of frames; measuring, in each edge image, a dynamic intensity value of one or more edge pixels associated with the non-rigid facial features; determining, in each edge image, a static intensity value of one or more edge pixels associated with the rigid facial features; and generating the plurality of time-series signals based upon a relative intensity value between the dynamic intensity value and the static intensity value across the plurality of edge images.

In some embodiments, generating a plurality of time-series signals based upon a position measurement for the facial features in each of the plurality of frames comprises measuring an optical flow value for each pixel in each of the plurality of frames; calculating a dynamic motion value for one or more pixels associated with the non-rigid facial features; calculating a static motion value for one or more pixels associated with the rigid facial features; and generating the plurality of time-series signals based upon a relative motion value between the dynamic motion value and the static motion value across the plurality of frames.

In some embodiments, extracting one or more classification features from the plurality of time-series signals comprises determining one or more statistical attributes of the plurality of time-series signals, and generating the one or more classification features based upon the statistical attributes. In some embodiments, the one or more statistical attributes comprise one or more moments of the time-series signal distribution, one or more temporal measurements of the time-series signal, and one or more correlation coefficients between the time-series signal and one or more pose measurements of the person's face.

In some embodiments, extracting one or more classification features from the plurality of time-series signals comprises selecting two or more sequential samples from the time-series signal; and generating the classification features based upon the two or more sequential samples. In some embodiments, applying a trained machine learning classification model to the extracted classification features to generate a fraud detection decision for the plurality of frames comprises applying the trained machine learning classification model using the classification features based upon the two or more sequential samples to generate a partial fraud detection score associated with a portion of the video corresponding to the two or more sequential samples; generating additional classification features based upon additional sequential samples from the time-series signal and applying the trained machine learning classification model using the additional classification features to generate a partial fraud detection score associated each portion of the video corresponding to the additional sequential samples; calculating an overall fraud detection score for the video based upon the partial fraud detection scores; and generating the fraud detection decision based upon the overall fraud detection score.

In some embodiments, extracting one or more classification features from the plurality of time-series signals comprises selecting two or more sequential samples from the time-series signal that correspond to a time of a first user interface event generated during video capture, and generating the classification features based upon the two or more sequential samples. In some embodiments, applying a trained machine learning classification model to the extracted classification features to generate a fraud detection decision for the plurality of frames comprises: applying the trained machine learning classification model using the classification features based upon the two or more sequential samples to generate a partial fraud detection score associated with a portion of the video corresponding to the two or more sequential samples; generating additional classification features based upon additional sequential samples from the time-series signal that correspond to a time of one or more other user interface events generated during video capture; applying the trained machine learning classification model using the additional classification features to generate a partial fraud detection score associated each portion of the video corresponding to the additional sequential samples; calculating an overall fraud detection score for the video based upon the partial fraud detection scores; and generating the fraud detection decision based upon the overall fraud detection score.

In some embodiments, the server computing device trains a machine learning classification model using the extracted classification features as input to create the trained machine learning classification model. In some embodiments, the server computing device transmits the fraud detection decision to the mobile computing device for display. In some embodiments, the server computing device transmits the fraud detection decision to a remote computing device for display to a user of the remote computing device.

In some embodiments, the server computing device continuously generates the fraud detection decision for the plurality of frames during video capture. In some embodiments, the server computing device determines that the captured video comprises enough frames to enable the server computing device to compute a fraud detection decision prior to stopping the video capture. In some embodiments, the mobile computing device restarts the video capture when the mobile computing device determines that the captured video does not comprise enough frames to enable the server computing device to compute a fraud detection decision.

In some embodiments, the mobile computing device generates one or more visual elements for display on the mobile computing device during video capture. In some embodiments, the one or more visual elements are randomly generated during video capture. In some embodiments, the one or more visual elements include random visual features, random spatial movements, appearances at random times during video capture, disappearances at random times during video capture, appearances at random display locations on the mobile computing device, or disappearances from random display locations on the mobile computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of detecting fraud during identity verification.

FIG. 3D is a diagram of an exemplary algorithm for calculating relative position of facial features.

FIG. 4B is a diagram of an exemplary algorithm for calculating relative intensity value for edge pixels.

FIG. 7 is a diagram of an exemplary workflow showing how the time-series signals change upon introduction of a stimulus event during video capture.

FIG. 8A is a flow diagram of a first exemplary embodiment of distribution of the processing steps for the fraud detection process FIG. 8B is a flow diagram of a second exemplary embodiment of distribution of the processing steps for the fraud detection process.

DETAILED DESCRIPTION

Figure 1:
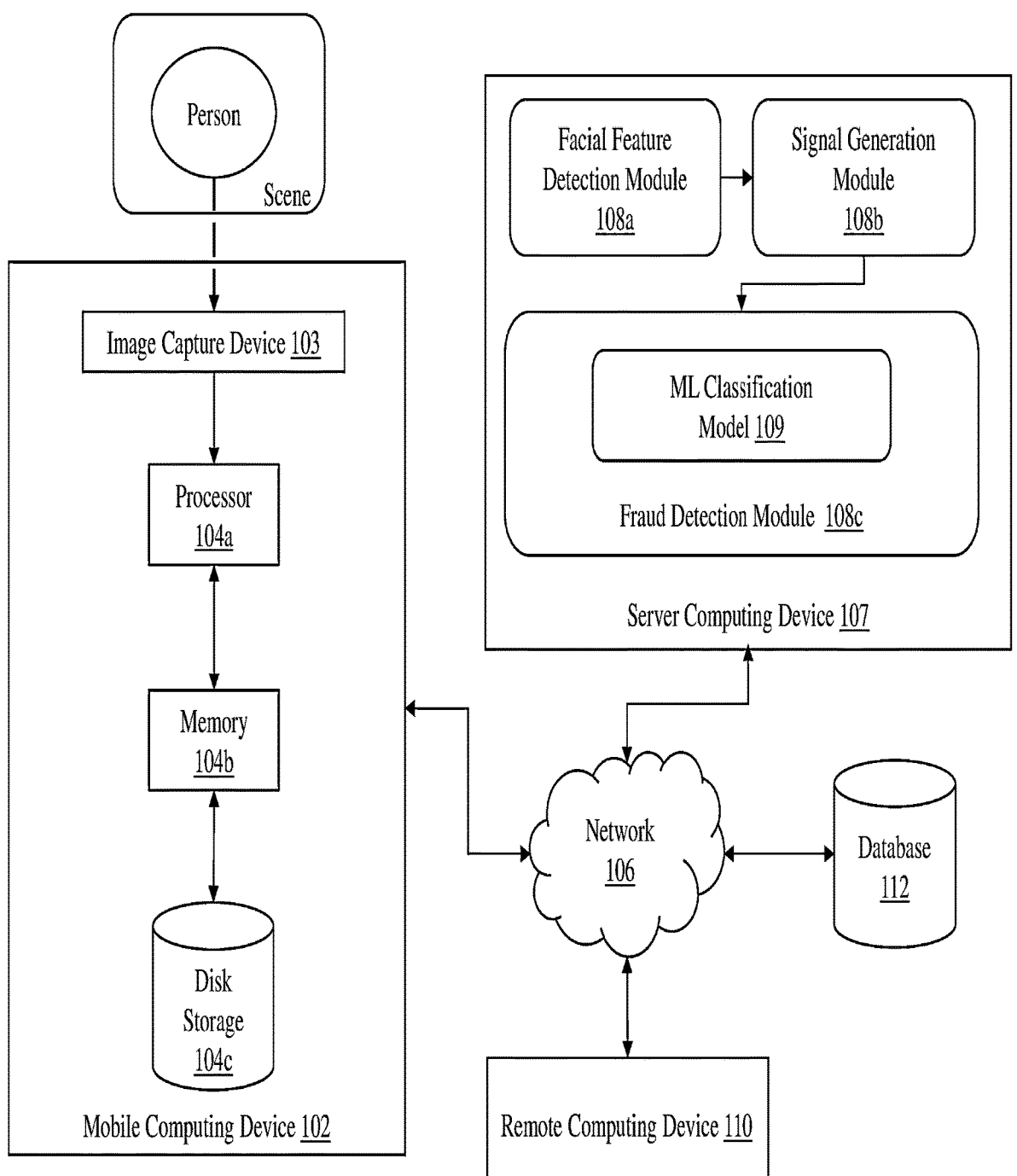
FIG. 1 is a block diagram of a system for detecting fraud during identity verification.

FIG. 1 is a block diagram of a system 100 for detecting fraud during identity verification. System 100 includes mobile computing device 102 that comprises image capture device 103, processor 104a, memory 104b, and disk storage 104c. Image capture device 103 is configured to capture video of a person in a scene—in particular, capturing video of the person's face. In some embodiments, mobile computing device 102 is coupled to server computing device 107, remote computing device 108, and database 110 via network 106. Server computing device 107 includes facial feature detection module 108a, signal generation module 108b and fraud detection module 108c. Fraud detection module 108c includes machine learning (ML) classification model 109.

Mobile computing device 102 is a device including specialized hardware and/or software modules that execute on processor 104a and interact with memory 104b and disk storage 104c of mobile computing device 102, to receive, process, and transmit data, and perform functions for detecting fraud during identity verification as described herein. In some embodiments, mobile computing device 102 comprises software, such as a software development kit (SDK) and/or application, that programmatically executes one or more processing steps described herein. Such software can be one or more specialized sets of computer software instructions programmed onto one or more dedicated processors (e.g., processor 104a) in mobile computing device 102 and can include specifically designated memory locations and/or registers for executing the specialized computer software instructions. In one embodiment, mobile computing device 102 includes a single software application (e.g., an 'app') or plug-in that is stored in memory 104b and executed by processor 104a.

Mobile computing device 102 also comprises an image capture device 103. In some embodiments, image capture device 103 comprises a camera that is capable of capturing video and still images of a scene. For example, a user of mobile computing device 102 may be positioned in the field of view of image capture device 103 such that mobile computing device 102 records video comprising one or more frames of the user's face using image capture device 103. As can be appreciated, in some embodiments the frames of the user's face can also include other features of the user, including but not limited to neck, shoulders, chest, torso, cars, etc. As shown in FIG. 1, image capture device 103 is integrated into mobile computing device 102—an example might be a smartphone that includes an embedded camera. It should be appreciated that in other embodiments, image capture device 103 may be a separate device from mobile computing device 102, which is coupled to mobile computing device 102 via a wired or wireless connection.

Exemplary mobile computing devices 102 include, but are not limited to, tablets, smartphones, laptop computers, and the like. It should be appreciated that other types of computing devices (e.g., desktop computers, Internet of Things (IOT) devices, smart appliances, wearables) that are capable of connecting to the components of system 100 can be used without departing from the scope of invention. Although FIG. 1 depicts a single mobile computing device 102, it should be appreciated that system 100 can include any number of mobile computing devices.

As mentioned above, in some embodiments mobile computing device 102 includes an application that is installed on mobile computing device 102—also called a native application or "app". The native application can be a software application which is installed locally on mobile computing device 102 and written with programmatic code designed to interact with an operating system that is native to mobile computing device 102. Such software may be available for download onto device 102 from, e.g., the Apple® App Store or the Google® Play Store. In some embodiments, the native application can be executed when the mobile computing device 102 is online—that is, communicatively coupled to network 106—or offline. In some embodiments, the offline mode feature can provide a benefit to the security and usability of the fraud detection process described herein—such as enabling fraud detection in situations where a network connection is not available, or where transmission of facial image data over a network is not desired (e.g., where a threat actor may try to intercept or misappropriate such data). In these embodiments, mobile computing device 102 can perform the fraud detection processing described herein and render a fraud detection decision to a user of mobile computing device 102 and/or one or more other persons in proximity to the user via a display screen of mobile computing device 102.

It should be appreciated that, in some embodiments, mobile computing device 102 can include a browser application, which comprises software executing on processor 104*a* of mobile computing device 102 that enables mobile computing device 102 to communicate via HTTP or HTTPS with remote servers addressable with URLs (e.g., web servers) to receive website-related content, including one or more webpages that contain user interface content, for rendering in the browser application and presentation on a display device coupled to mobile computing device 102. Exemplary mobile browser application software includes, but is not limited to, Firefox™, Chrome™, Safari™, and other similar software. The one or more webpages can comprise visual and audio content for display to and interaction with a user of device 102, including application functionality for detecting fraud during identity verification.

It should be appreciated that, in some embodiments, certain mobile computing devices may lack sufficient hardware or software capability—such as processing power, data storage capacity, communication circuitry, operating system features—to satisfactorily execute software and/or processing to perform every step of the fraud detection process as described herein. For example, an older model mobile device 102 may not be able to perform all steps of the facial analysis and fraud detection processes described herein within a desired or reasonable time frame. Therefore, in some embodiments, certain processing steps may be implemented on one or more separate computing devices (such as server computing device 107). In these embodiments, mobile computing device 102 can communicate with server computing device 107 via network 106 in order to carry out the functions and processing steps for detecting fraud during identity verification as described herein.

As shown in FIG. 1, processor 104*a* of mobile computing device 102 coordinates communications with image capture device 103, memory 104*b*, disk storage 104*c*, network 106, and server computing device 107 in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein.

Communications network 106 enables the other components of system 100 to communicate with each other in order to perform the process of detecting fraud during identity verification as described herein. Network 106 may be a local network, such as a LAN, or a wide area network, such as the Internet and/or a cellular network. In some embodiments, network 106 is comprised of several discrete networks and/or sub-networks (e.g., cellular to Internet) that enable the components of system 100 to communicate with each other.

Server computing device 107 is a combination of hardware, including one or more special-purpose processors and one or more physical memory modules, and specialized software modules that execute on one or more processors of server computing device 107, to receive data from and transmit data to other components of system 100, and perform functions for detecting fraud during identity verification as described herein. Server computing device 107 includes facial feature detection module 108*a*, signal generation module 108*b*, and fraud detection module 108*c* that execute on and/or interact with processor(s) of server computing device 107. In some embodiments, facial feature detection module 108*a*, signal generation module 108*b*, and fraud detection module 108*c* are specialized sets of computer software instructions programmed onto one or more dedicated processors in server computing device 107 and can include specifically designated memory locations and/or registers for executing the specialized computer software instructions. Although facial feature detection module 108*a*, signal generation module 108*b*, and fraud detection module 108*c* are shown in FIG. 1 as executing within a single server computing device 107, in some embodiments the functionality of modules 107*a* to 107*c* can be distributed among a plurality of server computing devices. As shown in FIG. 1, server computing device 107 enables facial feature detection module 108*a*, signal generation module 108*b*, and fraud detection module 108*c* to communicate with each other in order to exchange data for the purposes of performing the described functions. It should be appreciated that any number of computing devices, arranged in a variety of architectures, resources, and configurations (e.g., cluster computing, virtual computing, cloud computing) can be used without departing from the scope of the invention. Exemplary functionality of facial feature detection module 108*a*, signal generation module 108*b*, and fraud detection module 108*c* is described in detail throughout the specification.

Fraud detection module 108*c* includes machine learning (ML) classification model 109. ML classification model 109 is an artificial intelligence framework configured to receive classification features generated from time-series signals corresponding to rigid and non-rigid facial features of a user as input and apply one or more machine learning algorithms to the classification features to generate a fraud detection decision for the plurality of frames. In some embodiments, the classification features are embeddings or multidimensional vectors that comprise numerical values representing one or more attributes of the facial features for one or more frames.

ML classification model 109 can comprise one or more machine learning frameworks or algorithms that are executed on the classification features to predict whether a user depicted in the frames is a genuine person or a spoofed user. Exemplary machine learning frameworks and algorithms can include, but are not limited to, nearest neighbor, logistic regression, ridge regression, Random Forest, extra trees, ensemble voting classification, stacked classification, gradient boosting on decision trees (e.g., CatBoost available from catboost.ai, LightGBM available from Microsoft Corp., XGBoost available from xgboost.ai), feed forward neural networks (e.g., multilayer perceptron (MLP)), and others. As can be appreciated, ML classification model 109 can be trained on existing/pre-stored facial image data and correlated fraud detection classification data (e.g., stored in database 112) in order to enhance the accuracy of the fraud detection prediction values generated by model 109. Also, as additional facial image data and correlated fraud decisions are collected and generated by system 100 over time, this additional data can be used to re-train ML classification model 109 for a further increase in accuracy and performance.

As can be appreciated, fraud detection prediction data generated by model 109 is actionable and can be utilized by other components of system 100 (e.g., mobile computing device 102, remote computing device 110) in a manner that leverages the insight gained through the fraud prediction. For example, model 109 may predict that a user depicted in the images is spoofed or fraudulent based on unnatural or inconsistent movement and/or positioning of facial features. As such, model 109 can transmit the prediction to remote computing device 110 as part of a notification message. The notification message can comprise information that the user is not genuine, and another user (such as a security agent) can view the prediction on remote computing device 110 and take appropriate action Remote computing device 110 is a combination of hardware, including one or more special-purpose processors and one or more physical memory modules, and specialized software modules that execute on one or more processors of remote computing device 110, to receive data from and transmit data to other components of system 100, and perform functions for detecting fraud during identity verification as described herein. In some embodiments, remote computing device 110 is operated by a user that seeks to confirm whether a user of mobile computing device 102 is genuine (e.g., a real, live user) or fraudulent (e.g., a spoofed user). Remote computing device 110 can receive a fraud detection decision from mobile computing device 102 during a remote identity verification process, and device 108 can display the fraud detection decision to a user of remote computing device 110 (e.g., via a display screen) so that the user can take appropriate action, if necessary.

Database 112 is deployed on a single computing device (or in some embodiments, on a plurality of computing devices) coupled to server computing device 107 via network 106. Database 112 is configured to receive, generate, transmit, and store specific segments of data relating to the process of detecting fraud during identity verification as described herein. In some embodiments, all or a portion of database 112 can be integrated with server computing device 107 or be located on a separate computing device or devices. Database 112 is configured to store portions of data used by the other components of system 100, as will be described in greater detail throughout the specification. In some embodiments, database 112 is located in a cloud storage infrastructure comprising one or more nodes accessible by server computing device 107.

FIG. 2 is a flow diagram of a computerized method 200 of detecting fraud during identity verification, using system 100 of FIG. 1. A user of mobile computing device 102 can connect to, e.g., server computing device 107 via network 106 during an identity verification process where a user at remote computing device 110 seeks to confirm that the user at device 102 is genuine. The user of mobile computing device 102 launches an application to capture (step 202) video of the user's face. As can be appreciated, in some embodiments, the video comprises a video stream or video file with a sequence of images (also called frames). In some embodiments, the video must be of a minimum length or duration (e.g., three seconds) and with a minimum frames-per-second value (e.g., 30 FPS). As can be appreciated, encoding in a video is very different from encoding single images and in some cases video encoding is lossy. Therefore, in some embodiments, the images are not captured as a video stream or video file, but instead are captured as a sequence of single images. When the images are captured as single images, image capture module 103 may trigger a separate autofocus loop for each image. As can be understood, embodiments, techniques, algorithms and examples are provided throughout this specification which refer to capture and analysis of a video stream or video file; however, these embodiments, techniques, algorithms and examples are equally applicable to a sequence of individual images.

During video capture, software on mobile computing device 102 can prompt the user via a user interface displayed on mobile computing device 102 to perform one or more facial movements (e.g., raising eyebrows, smiling, looking around, rotating their head, etc.) in order to capture video of the user's face as certain facial features change position across frames of the video. In some embodiments, the facial features captured in the video comprise both rigid and non-rigid features. Examples of rigid facial features include, but are not limited to, the nose (e.g., bridge of the nose) and outline of the face. Examples of non-rigid facial features include, but are not limited to, irises, eyelids, eyebrows, eye corners, and mouth.

Mobile computing device 102 transmits (step 204) captured video frames to server computing device 107. In some embodiments, the frames are transmitted in real-time for processing by server computing device 107. During video capture, it should be appreciated that some of the frames may not be suitable for facial analysis and fraud detection processing due to certain deficiencies (blurriness, out of focus, glare, etc.) that introduce undesirable noise and thus degrade the image quality such that the user's face and/or one or more of its features cannot be seen or identified adequately. Noise can arise from the image/data acquisition process, such as glare (i.e., oversaturation from a light source), blur, focus, low quality video, white balance, or other image sensor noise (e.g., blooming, readout noise, or custom calibration variations). In other instances, certain frames may not be usable for fraud detection purposes because the angle of the user's face in the frame is too extreme, or the face is partially cut off (and thus the facial features cannot be properly analyzed). In some embodiments, facial feature detection module 108a can perform a basic video quality check to confirm attributes such as video length, frames per second, resolution, and the like meet or exceed minimum values (and/or fall below maximum values) that are considered adequate by module 108a.

In addition, in some embodiments facial feature detection module 108a analyzes image quality metrics of the frames at a temporal level, at a global quality level, at a local quality level, or any combination thereof. Temporal quality metrics can include, but are not limited to, jitter, motion measurement, etc. As can be appreciated, motion blur can be introduced into one or more images due to image capture device 103 capturing a frame when the user's head and/or mobile device 102 is moving. Facial feature detection module 108a can analyze a sequence of frames and measure motion of the face across frames, then select a subgroup of frames that have a lower amount of motion and discard another subgroup of frames that have a higher amount of motion (or variability of motion). In addition, this approach can be beneficial to reduce the searching space so that facial feature detection module 108a can perform more efficiently in locating the face in the images. Global image quality metrics relate to quality characteristics of the image as a whole and can include, but are not limited to, glare, blur, white balance, resolution, sensor noise characteristics such as blooming, readout noise, or custom calibration variations, and the like. Local image quality metrics relate to quality characteristics of certain portions of the frame and can include, but are not limited to, low-level blur, low-level sharpness, and the like.

In some embodiments, facial feature detection module 108a factors each of the above quality metrics when generating an overall quality score for each image, then discards images from the video that do not meet a particular quality score value. For example, facial feature detection module 108a rank each image according to the quality of the image, considering such factors as size of the face in the frame, temporal metrics, global quality metrics, local quality metrics, etc. The ranking can be used by facial feature detection module 108a to identify one or more frames that have a high likelihood of being processed and classified correctly by fraud detection module 108c. In some embodiments, the image preprocessing described herein can occur at mobile computing device 102 prior to transmitting the frames to server computing device 107.

Furthermore, in some embodiments facial feature detection module 108a executes a face detection algorithm on each frame received from client computing device 102 to determine whether the frame contains a face. An exemplary facial detection algorithm used by module 108a is the Face Detection module provided in the MediaPipe software available from Google, Inc. Generally, the MediaPipe Face Detection module is based upon the BlazeFace face detector algorithm described in V. Bazarevsky et al., "BlazeFace: Sub-millisecond Neural Face Detection on Mobile GPUs," *CVPR Workshop on Computer Vision for Augmented and Virtual Reality*, Long Beach, CA, USA, 2019 arXiv: 1097.05047 [cs.CV], 14 Jul. 2019. Further detail about the operation of the MediaPipe Face Detection software is described at google.github.io/mediapipe/solutions/face_detection. When module 108a determines that the received video contains fewer than a threshold number of frames with faces detected in the frames, module 108a can reject the video for further processing and in some embodiments, mobile computing device 102 can prompt the user to record another video. As can be appreciated, in some embodiments the above-described face detection process can be performed on mobile computing device 102 instead of on server computing device 107.

Figure 3A:
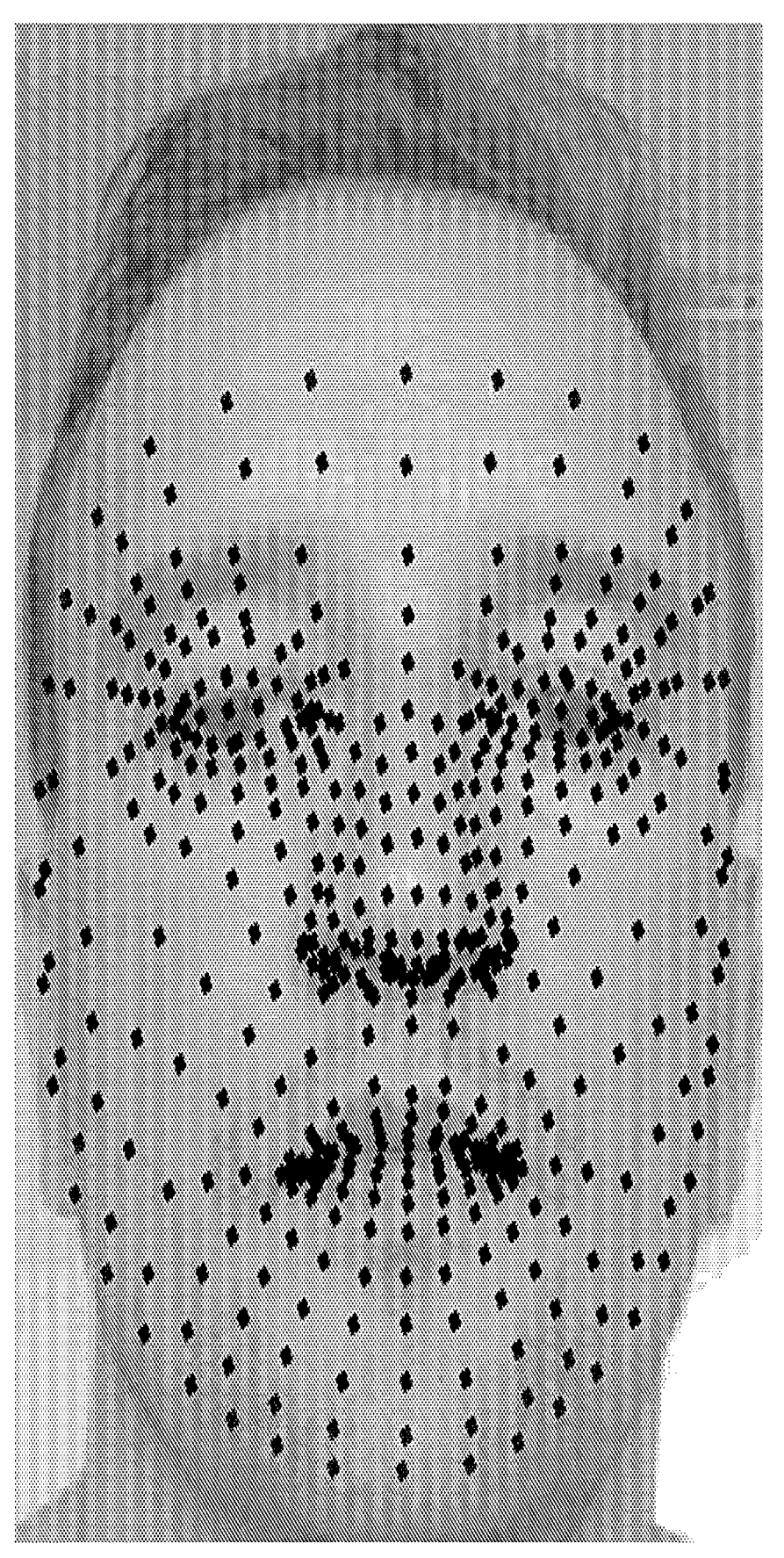
FIG. 3A is a diagram of an exemplary frame of a person's face showing the landmarks detected by facial feature detection module.

Once the extracted frames have been pre-processed, facial feature detection module 108a detects (step 206) a location of one or more facial features of the person's face in each of the plurality of received frames. In some embodiments, module 108a detects the location of facial features using a landmark regression algorithm applied to each frame. An exemplary landmark regression algorithm used by module 108a is the MediaPipe Face Mesh software module available from Google, Inc. Generally, the MediaPipe Face Mesh software utilizes a machine learning pipeline comprising two real-time deep learning neural networks: a detector to compute face locations from an image and a 3D face landmark model that operates on the face locations and predicts the approximate 3D surface via regression. Typically, the MediaPipe FaceMesh software can generate approximately 400 to 460 3D landmark keypoints for a given facial image, which may be considered a sparse reconstruction. Further detail about the operation of the MediaPipe Face Mesh software is described at google.github.io/mediapipe/solutions/face_mesh. In some embodiments, module 108a can increase the number of keypoints by interpolating between the landmark points generated by MediaPipe to generate a dense reconstruction. FIG. 3A is a diagram of an exemplary frame of a person's face showing the landmarks detected by module 108a. In FIG. 3A, the landmarks appear as black dots. It should be appreciated that other types of landmark regression algorithms can be used, provided that the algorithm locates enough relevant facial features, including but not limited to irises, eyelids, eye corners, nose, mouth, and face outline. In some embodiments, module 108a can further calculate yaw, pitch and roll of the face pose for every frame containing a face. An exemplary pose estimation algorithm for calculating yaw, pitch, and roll of the face pose is described in E. Arcoverde et al., "Enhanced real-time head pose estimation system for mobile device," *Integrated Computer Aided Engineering* 21(3):281-2, April 2014, which is incorporated herein by reference.

Figure 3B:
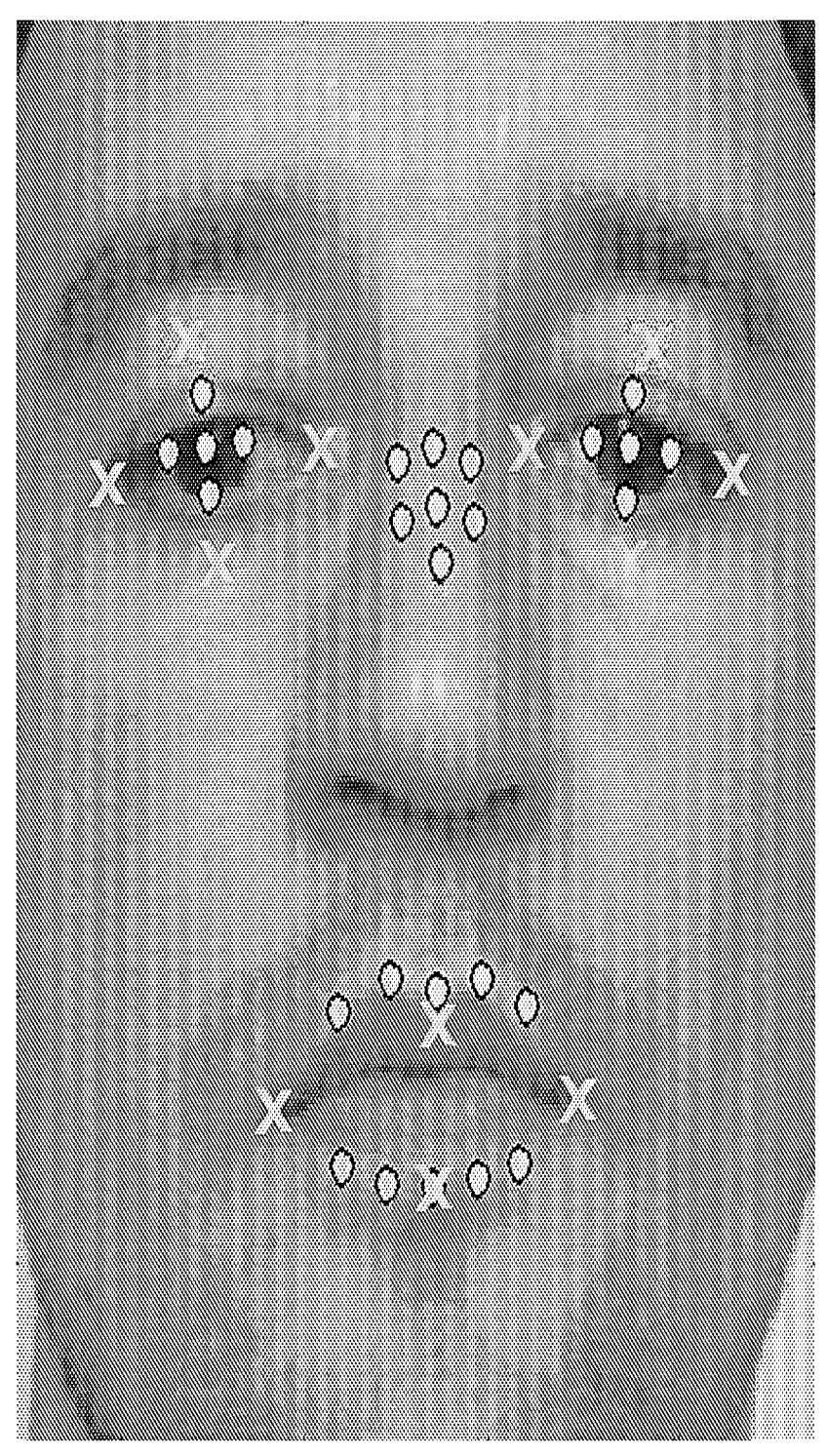
FIG. 3B is a diagram of an exemplary frame of a person's face showing the location of a subset of rigid features and a subset of non-rigid features.
Figure 3C:
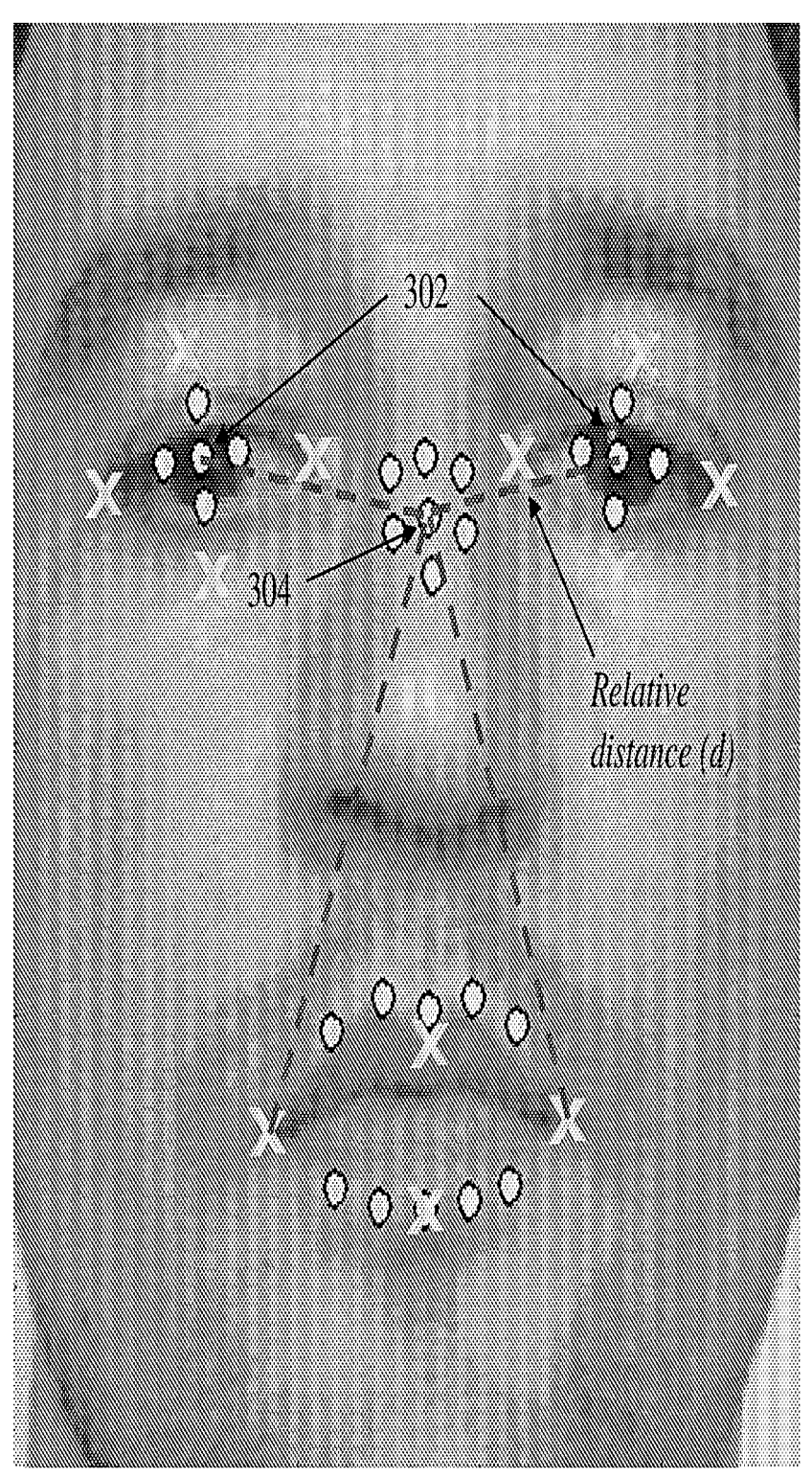
FIG. 3C is a diagram of an exemplary calculation of relative position of facial features in a given frame for generating time-series signals.
Figure 3E:
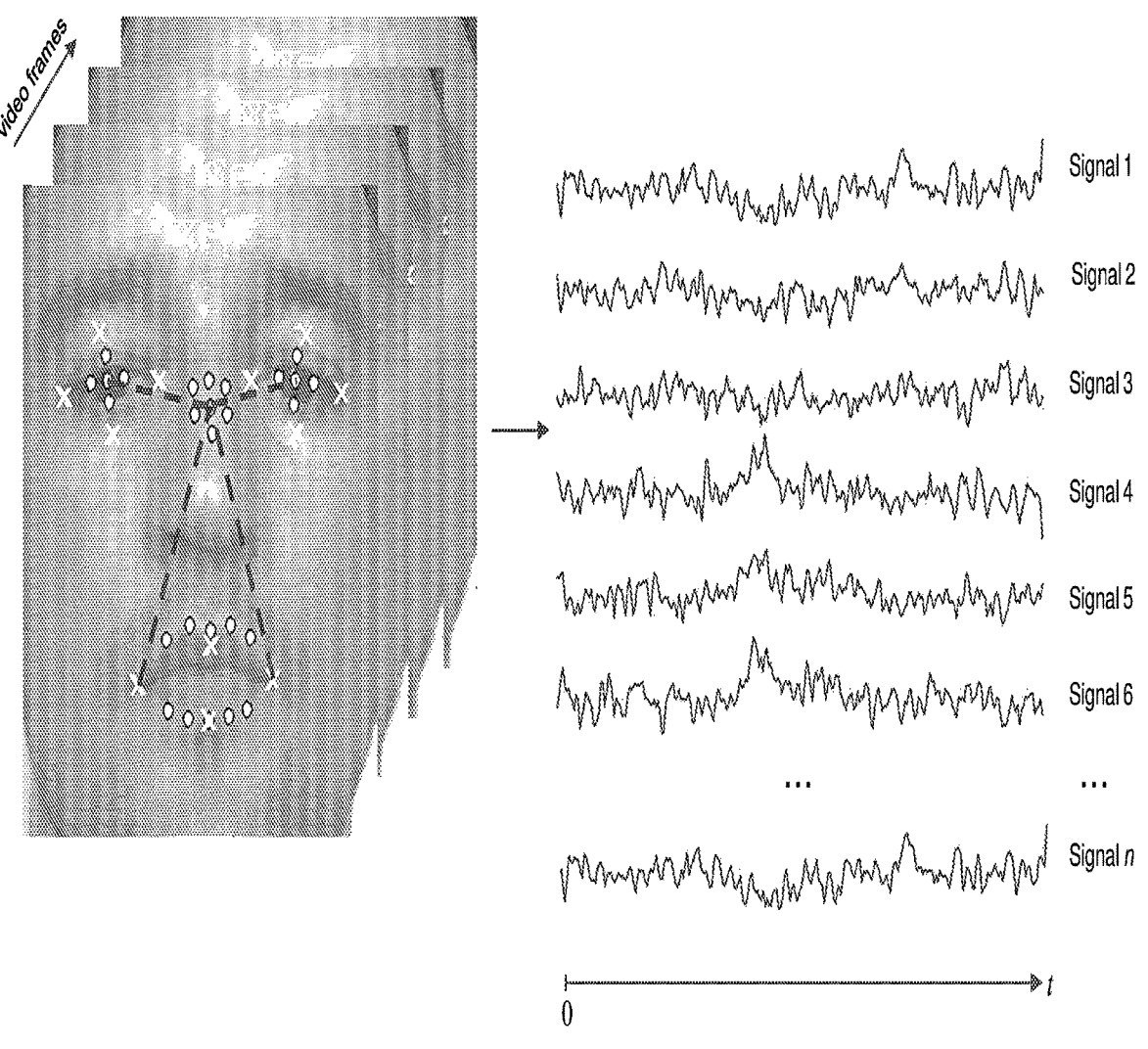
FIG. 3E is a diagram showing the generation of relative landmark position time-series signals based upon the relative distance measurements for landmarks across a plurality of frames.

Once the landmarks for a plurality of rigid facial features and non-rigid facial features are created for each frame, signal generation module 108b generates (step 208) time-series signals based upon a position measurement for the facial features in each frame. In certain embodiments, module 108b can generate the time-series signals using any of a number of different methods, as described below:

Relative Position—signal generation module 108b can generate the time-series signals by calculating a relative position between the location of each non-rigid facial feature and the location of one or more of the rigid facial features across the plurality of frames and generating the plurality of time-series signals based upon the relative positions. For example, module 108b can use the relative position of the face landmarks in each frame over the course of the video to generate the time-series signals. For this approach, module 108b calculates the position of landmarks representing "non-rigid" components of the face such as (but not limited to) iris location, eyelid position, mouth/lip position, eyebrow position and so forth, relative to rigid components of the face such as (but not limited to) the bridge of the nose. FIG. 3B is a diagram of an exemplary frame of a person's face showing the location of a subset of rigid features (e.g., bridge of nose) and a subset of non-rigid features (e.g., irises, corners of mouth) and FIG. 3C is a diagram of an exemplary calculation of relative position of facial features in a given frame for generating time-series signals. As shown in FIG. 3C, a plurality of landmarks for non-rigid facial features (e.g., landmarks 302 for irises) are applied to the frame. As can be seen, landmarks for other non-rigid facial features (e.g., mouth, eye shape) are applied. Landmarks for rigid facial features (e.g., landmarks 304 for the bridge of the nose) are also applied. Module 108b determines the relative position (d) between each landmark for non-rigid features and each landmark for rigid features in each frame and converts these positions into time-series signals. By calculating position signals relative to rigid facial feature points, module 108b overcomes the problem of confusing whole-face motion within a frame of the video with non-rigid motion of the face itself. An exemplary algorithm for calculating relative position is provided in FIG. 3D. Once relative positions are calculated, module 108b generates the corresponding time-series signals. FIG. 3E is a diagram showing the generation of relative landmark position time-series signals (i.e., Signals 1 to n) based upon the relative distance measurements for landmarks across a plurality of frames. As shown in FIG. 3E, Signals 1 to n are generated starting at time 0 through time t.

Figure 4A:
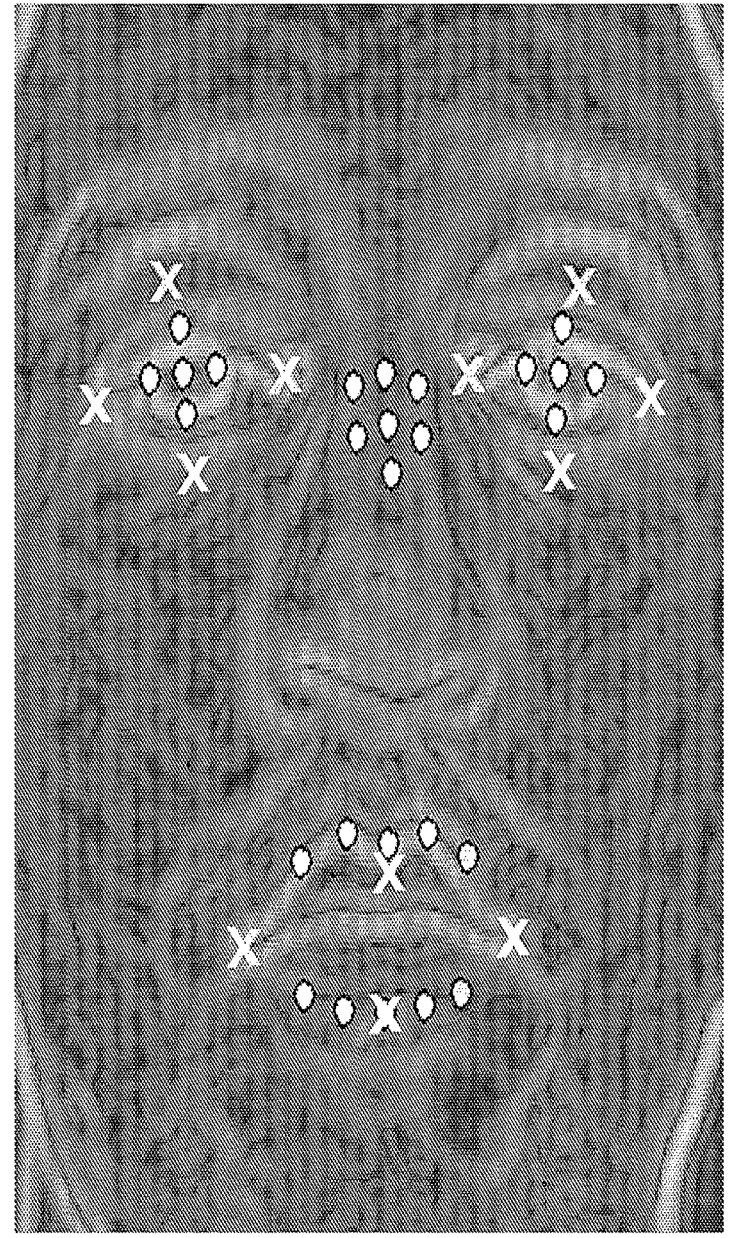
FIG. 4A is a diagram of an exemplary edge-image generated by signal generation module.
Figure 4C:
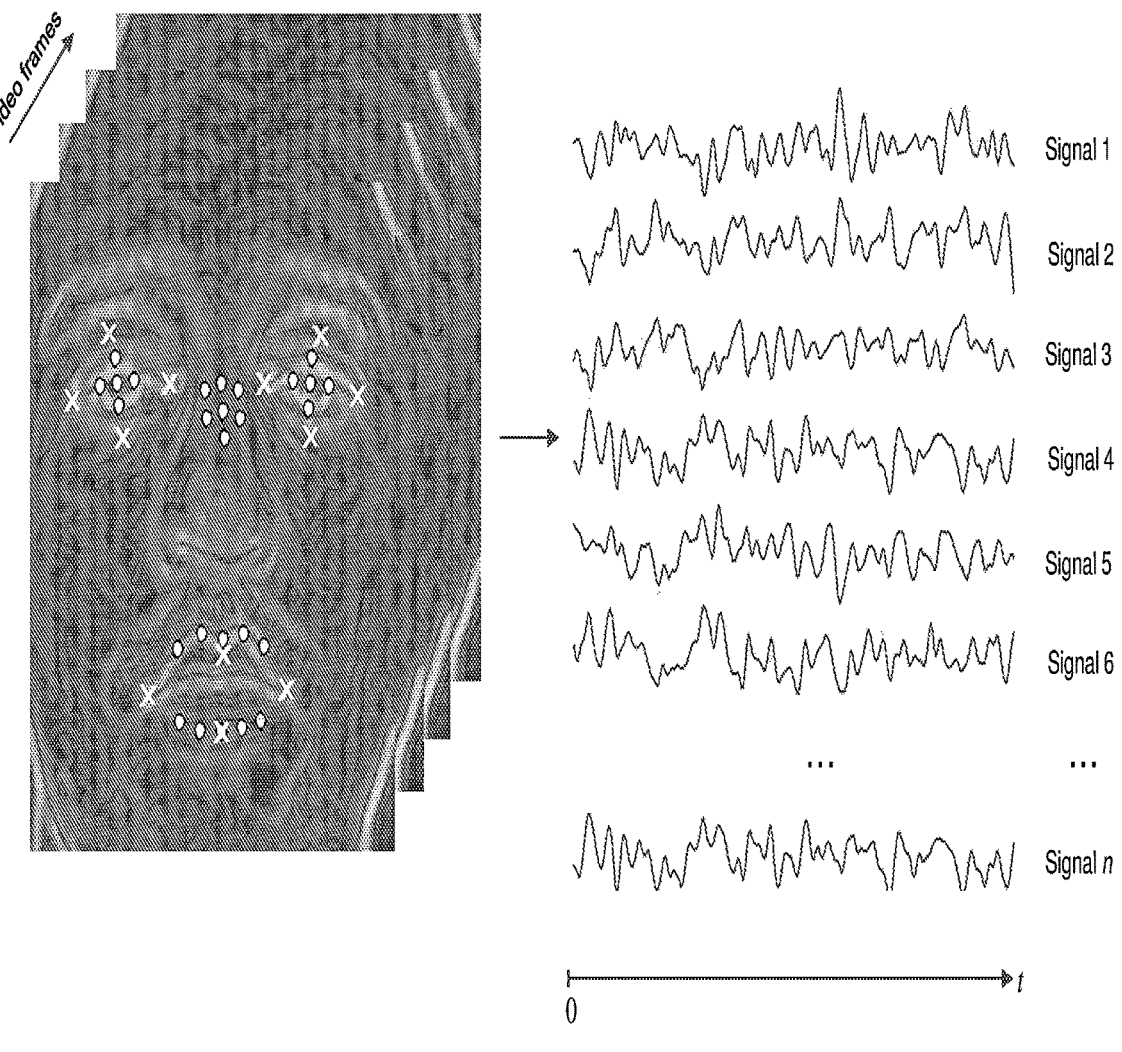
FIG. 4C is a diagram showing the generation of relative intensity value time-series signals based upon the relative intensity values for edge pixels across a plurality of frames.

Edge Pixel Values—signal generation module 108b can create the time-series signals by generating an edge image for each of the plurality of frames, measuring, in each edge image, a dynamic intensity value of one or more edge pixels associated with the non-rigid facial features, determining, in each edge image, a static intensity value of one or more edge pixels associated with the rigid facial features, and generating the plurality of time-series signals based upon a relative intensity value between the dynamic intensity value and the static intensity value across the plurality of edge images. For example, module 108b can use an edge-image derived from the frames to measure values of the edge pixels around the positions of the face landmarks in each frame. FIG. 4A is a diagram of an exemplary edge-image 400 generated by module 108b. FIG. 4A also depicts certain landmark positions. The edge-image can be derived from the frame using an edge detection algorithm with an optional low-pass spatial filtering step prior to edge detection in order to increase edge thickness. An exemplary edge detection algorithm used by module 108b is described in J. Canny, "A Computational Approach to Edge Detection." IEEE Transactions on Pattern Analysis and Machine Intelligence (Volume: PAMI-8, Issue: 6, November 1986), which is incorporated herein by reference. As can be appreciated, module 108b can create time-series signals for edge pixel intensities using relative pixel intensities, with known static edges within the face region used to provide reference values for scaling. Again, using relative values with respect to known static facial features allows non-rigid motion within the face to be distinguished from whole-face movement. This approach creates a time-series signal for each landmark chosen to monitor non-rigid motion—usually including (but not limited to) landmarks in the eye region, eyebrows, and around the mouth. An exemplary algorithm for calculating relative intensity value is provided in FIG. 4B. Once relative intensity values are calculated, module 108b generates the corresponding time-series signals. FIG. 4C is a diagram showing the generation of relative intensity value time-series signals (i.e., Signals 1 to n) based upon the relative intensity values for edge pixels across a plurality of frames. As shown in FIG. 4C, Signals 1 to n are generated starting at time 0 through time 1.

Optical Flow Values—signal generation module 108b can create the time-series signals by measuring an optical flow value for each pixel in each of the plurality of frames, calculating a dynamic motion value for one or more pixels associated with the non-rigid facial features, calculating a static motion value for one or more pixels associated with the rigid facial features, and generating the plurality of time-series signals based upon a relative motion value between the dynamic motion value and the static motion value across the plurality of frames. For example, module 108b measures the optical flow for each pixel in each frame over the course of the video. Module 108b can use any of a number of different optical flow methods, including but not limited to the Lucas-Kanade method (as described in D. Patel & S. Upadhyay, "Optical Flow Measurement using Lucas Kanade Method," *International Journal of Computer Applications* (0975-8887), Vol. 61, No. 10, January 2013 (incorporated herein by reference)) and the Horn-Schunk method (as described in B. Horn & B. Schunck, "Determining Optical Flow," *Artificial Intelligence,* 17(1-3): 185-203, August 1981 (incorporated herein by reference)). The optical flow method produces a motion value for each pixel in a frame. Module 108b creates the time-series signals by taking the motion values in face regions of interest as defined by the landmark locations (regions of interest include but are not limited to the eye regions, mouth, eyebrows) relative to motion values at known rigid reference points on the face (including but not limited to the nose bridge) and possibly other points within the frame. Again, using relative values with respect to known static facial features allows non-rigid motion within the face to be distinguished from whole-face movement. This approach creates a time-series for each region of interest chosen to monitor non-rigid motion—usually including (but not limited to) the eye region, eyebrows, and around the mouth.

Figure 5:
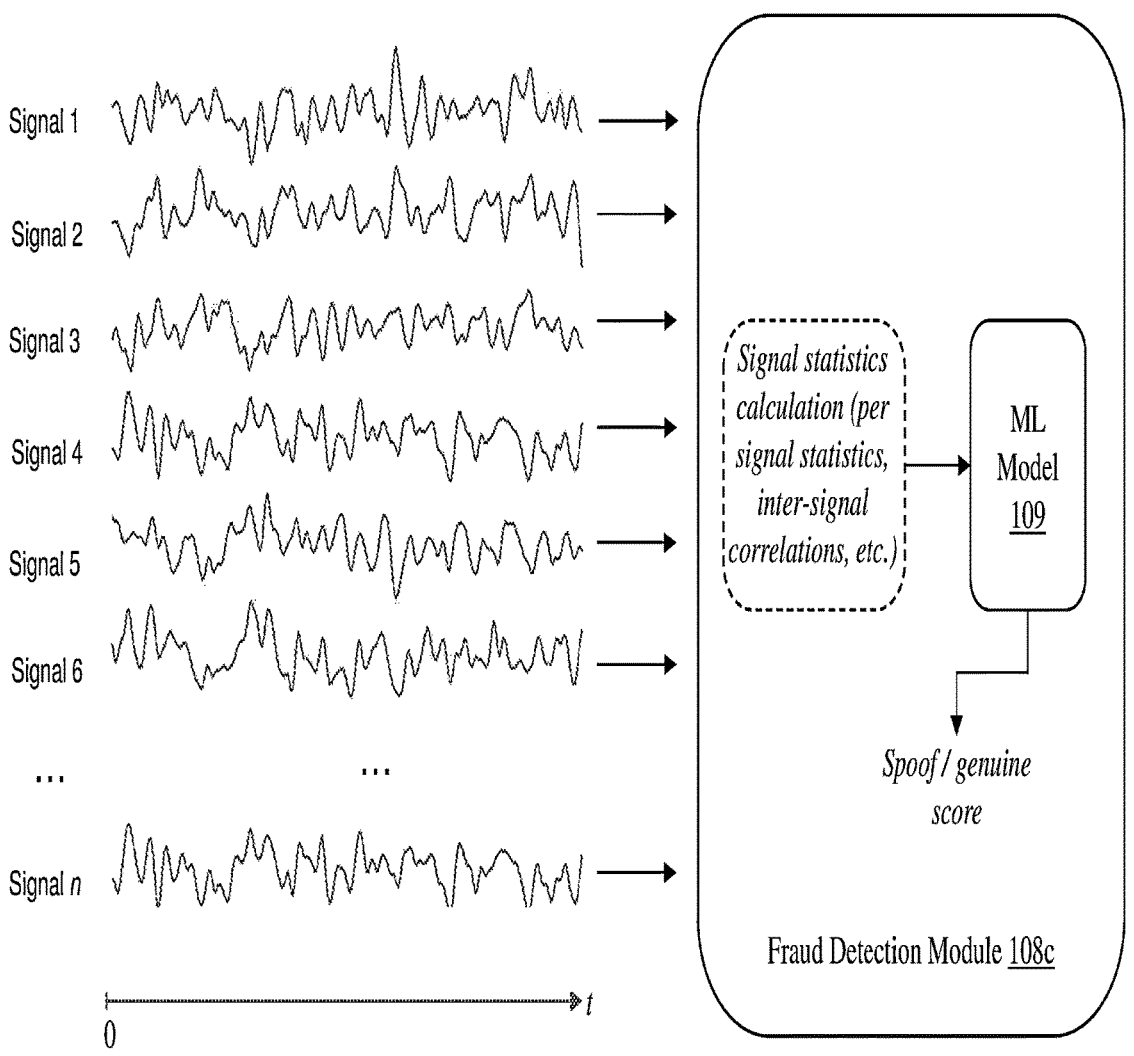
FIG. 5 is a diagram of an exemplary workflow showing the generation of the time-series statistics from the time-series signals and providing the statistics to a machine learning classification model for extracting machine learning features.

Turning back to FIG. 2, after generation of the time-series signals, fraud detection module 108c extracts (step 210) one or more classification features from the time-series signals for the frames. As described below, the classification features are used by a trained classification model (i.e., ML classification model 109) to generate a fraud detection decision as to whether the video contains a spoofed or genuine face. In certain embodiments, module 108c can extract the classification features using any of a number of different methods, as described below:

Statistical Attributes—fraud detection module 108c can determine one or more statistical attributes of the plurality of time-series signals and generate the one or more classification features based upon the statistical attributes. For example, module 108c can determine a plurality of statistics that describe the time-series signals for the video, including but not limited to the moments of the time-series signal distribution (e.g., mean, variance, skew, kurtosis), temporal measurements of the time-series signals such as signal roughness and autocorrelation measures (e.g., Ljung-Box statistic as described in G. M. Ljung & G. E. P. Box, "On a measure of lack of fit in time series models," Biometrika, Vol. 65, Issue 2, August 1978, pp. 297-303 (incorporated herein by reference)), and one or more correlation coefficients between the time-series signals themselves and/or correlation coefficients between the time-series signals and pose measurements of the person's face (e.g., yaw, pitch, roll). FIG. 5 is a diagram of an exemplary workflow 500 for module 108c showing the generation of the time-series statistics from the time-series signals and providing the statistics to ML classification model 109 for extracting machine learning features.

Figure 6:
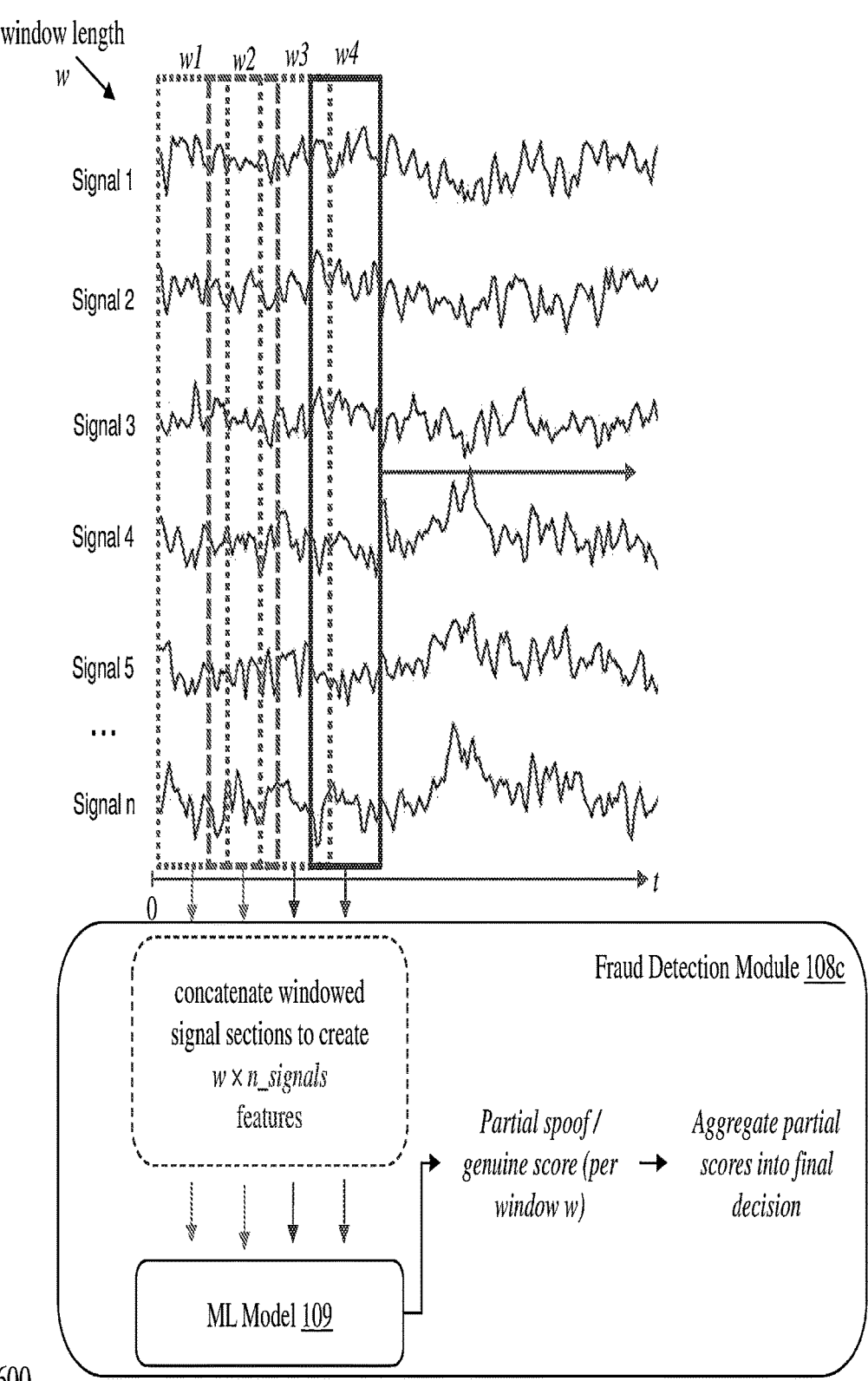
FIG. 6 is a diagram of an exemplary workflow showing the generation of classification features from windowed samples of the time-series signals using a machine learning classification model and determination of partial fraud detection scores for each sample.

Sliding Window—fraud detection module 108c can apply a sliding window to the time-series signals for the video in order to extract the classification features. For example, module 108c can select and analyze two or more sequential samples from the time-series signals and generate the classification features based upon the two or more sequential samples. The two or more sequential samples are used as input features to train a machine learning model (i.e., ML classification model 109), where the number of input features of the model 109 is specified as the length of the window times the number of time-series signals. Module 108c can then execute the trained ML classification model 109 to output a fraud detection score for certain segments of video corresponding to a window length of the sequential samples. In some embodiments, module 108c applies the trained machine learning classification model 109 using the classification features based upon the two or more sequential samples as input to generate a partial fraud detection score associated with a portion of the video corresponding to the two or more sequential samples and then generates additional classification features based upon additional sequential samples from the time-series signal. Module 108c then applies the trained machine learning classification model 109 using the additional classification features to generate a partial fraud detection score associated each portion of the video corresponding to the additional sequential samples and calculates an overall fraud detection score for the video based upon the partial fraud detection scores. Using the overall fraud detection score, module 108c can generate the fraud detection decision for the video as either containing a spoofed face or a genuine face. FIG. 6 is a diagram of an exemplary workflow 600 for module 108c showing the generation of classification features from windowed samples of the time-series signals using ML model 109 and determination of partial fraud detection scores for each sample which are then aggregated into a final fraud decision.

Sliding Window with User Interface Event(s)—fraud detection module 108c can combine the sliding window method described above with knowledge of particular user experience events occurring during video capture, so that particular prompts from the user interface can be correlated with changes in the time-series signals. At predetermined or random points during video capture, the user interface of mobile computing device 102 may generate for display to the user a surprising stimulus designed to elicit specific type(s) of motion in the user's face. For example, mobile computing device 102 can generate a graphical object in the user interface that moves around the screen which prompts the user to follow the object with their eyes. In another example, mobile computing device 102 may display an avatar with specific facial movements that the user is asked to mimic. It should be appreciated that other types of stimulus (e.g., visual, aural, haptic) can be generated by mobile computing device 102 to cause the user's facial features to move. Module 108c can use the knowledge of when one or more stimuli occurred during video recording to look for patterns in the time-series signals specifically around the time one or more of the stimuli were triggered. Correlation of these patterns to the timing of the stimuli enables module 108c to extract classification signals for each of the stimulus windows that are used to generate a fraud detection decision. FIG. 7 is a diagram of an exemplary workflow 700 showing how the time-series signals change upon introduction of a stimulus event during video capture. As shown in FIG. 7, at time t=0, a user begins capturing video of their face using mobile computing device 102. Corresponding time-series signals 702 are generated. At time t', the user interface of mobile computing device 102 initiates a stimulus event (e.g., displaying objects on the screen) which continues for a certain duration dt. During the stimulus event, the user may react in a way that causes them to move their head and/or facial features. As can be seen, the corresponding time-series signals 704 for the time period dt indicate significant movement of the user's facial features.

Exemplary stimuli can include, but are not limited to, random visual elements presented to the user of mobile computing device 102. In this context, randomness can be expressed in the stimuli through the visual appearance of the stimuli, the time at which the stimuli are presented on the mobile device, or both. The user interface of mobile computing device 102 can be configured to randomly introduce a graphical element to which the user would react via a change in facial expression or movement of facial features. For example, during video capture, the user interface can randomly display a bird fluttering in and out from different random directions on the user interface, a message suddenly appearing and disappearing at random areas on the user interface, or another type of visual element. When the visual element appears in a particular area of the interface, the user of mobile computing device 102 may direct their gaze to the element and follow the path of the element (i.e., corresponding to eye movement). If the visual element appears suddenly or has a surprising or unusual visual appearance, the user may react in any number of different ways—such as raising their eyebrows, opening their mouth, furrowing their brow, smiling, turning their head, etc. Importantly, in this embodiment, the user interface does not prompt the user of mobile device 102 prior to introduction of the visual stimuli or otherwise instruct the user to perform any movements. As mentioned above, the corresponding time-series signals captured by system 100 reflect these facial movements.

In some embodiments, the randomness of the visual element can be determined by applying one or more different techniques such as random number generation (e.g., seeded using a changing or non-predictable value obtained from one or more hardware or software features of mobile device 102—clock, device movement from gyroscope or accelerometer, etc.), obtaining a random value from an external source, and so forth. For example, once the mobile device 102 obtains a random number, the device 102 can be configured with one or more visual element generation algorithms to dynamically create a corresponding visual element with characteristics (appearance, time, movement, etc.) that are solely based on the random number. As can be appreciated, the main goal is to produce a random visual element that cannot be predicted in advance or replicated by the user during subsequent identity verification.

One significant benefit of using the random visual element technique described above is the ability to thwart malicious identify verification attempts that rely upon deepfake technology, or other synthetic or pre-recorded facial images. As is known, current deepfake technology typically comprises media (usually video) in which a person's face in the video is digitally altered to be replaced with someone else's likeness while retaining the original person's facial movements—with the intent to deceive or spread false information. In some cases, the original person's speech is also replaced with speech that sounds almost identical to the replacement's voice. Using the randomness described herein, it would be practically impossible using current technology for a malicious actor to generate a deepfake or other synthetic media that could accurately react to the visual stimuli with facial expressions and movements that would be considered as authentic by system 100. As deepfake technology improves, it may eventually be possible for a deepfake to 'react' in real time to random visual stimuli in the user interface—but this type of sophisticated attack does not presently appear to be feasible—and the random visual stimuli would still be able to prevent the majority of deepfake attacks.

Time-Series Signals as Direct Input—in some embodiments, fraud detection module 108c can use the time-series signals directly as classification features to train ML classification model 109. In these embodiments, ML classification model 109 can be a temporal ML model (e.g., recurrent neural network, time-convolutional neural network) that analyzes the time-series signals to generate a fraud detection decision for one or more portions of the video and/or for the entire video.

It should be appreciated that any of the above classification feature extraction approaches can be combined to create a diverse set of classification features from the time-series data. These approaches can be applied to the whole video, or to shorter sections of the video depending on how the video capture experience operates and/or how system 100 is deployed. In some embodiments, fraud detection module 108c trains ML classification model 109 using historical data containing videos of genuine, live faces and/or videos of various spoofed faces (e.g., masks, printed photos) that module 108c may encounter in production. For example, when module 108c extracts classification features for an entire video at once, then the trained ML classification model 109 can be used to produce a single score for the entire video indicating whether the video contains a genuine face or a spoofed face.

In another example, when module 108c extracts classification features from shorter segments of the video, then the trained ML classification model 109 can be used to produce a score for each of the segments of the overall video. This approach allows for more flexibility in how the overall system 100 is implemented. For instance, when fraud detection module 108c and ML classification model 109 are deployed on server computing device 107 (e.g., in a cloud-based environment), mobile computing device 102 can transmit video to server computing device 107 in portions or chunks and module 108c can make a fraud detection decision (also called a liveness decision) when the ML classification model 109 produces a pre-specified number of confident classifications. As can be understood, this approach reduces data transfer requirements as well as enabling the video capture experience to end prematurely when video is transmitted to and analyzed by server computing device 107 in parallel with the video being recorded by mobile computing device 102—resulting in faster fraud detection determinations.

As mentioned above, fraud detection module 108c applies (step 212) trained ML classification model 109 to the classification features extracted from the captured video to generate a fraud detection decision. For example, a user of mobile computing device 102 can begin transmitting new facial video to server computing device 107 and after facial detection and signal generation, fraud detection module 108c executes ML model 109 to predict whether a face depicted in the video (or portions of the video) is genuine or spoofed. In some embodiments, ML model 109 can be used on its own, or combined with other machine learning classification models trained on other aspects of the videos to produce an ensemble of classification models whose overall performance is better than any individual classification model. For example, in one embodiment, a non-rigid motion classification model is used in combination with a deep neural network trained to classify genuine versus spoofed videos based only on individual frames, i.e., ignoring the temporal aspect of the video and only considering spatial information. Combining the temporal approach of the non-rigid motion classification model with the spatial approach of the frame-based classification model leads to overall better system performance. Ensembling can be achieved in a variety of ways (e.g., averaging final output scores from each classification model, or using each classification model as its own "feature extractor" and learning a further downstream machine learning classification model using these extracted features).

After the fraud detection decision is made by module 108c, server computing device 107 can transmit data associated with the fraud detection decision to one or more remote computing devices (e.g., device 110). In one example, remote computing device 110 can generate a user interface screen for display that provides a visual indicator of the fraud detection decision to a user of the corresponding device 110. The user interface screen can include any of a number of different attributes (e.g., colors, shapes, text, etc.) that enables the user to quickly understand the fraud detection decision. For example, when fraud is not detected in the video, the user interface can display a message in green text, a checkmark, etc. When fraud is detected in the video, the user interface can display a message in red text, an 'X', etc.

As mentioned previously, the components of system 100 can be deployed in a variety of different architectures and computing platforms, where the functionality of mobile computing device 102 and server computing device 107 is distributed across one or more computing devices. In one embodiment (as shown in FIG. 1), modules 108a-108c are deployed on server computing device 107—which is located remotely from mobile computing device 102. For example, server computing device 107 can be deployed in a cloud environment that is coupled to mobile computing device 102 via one or more networks (i.e., network 106). FIG. 8A is a flow diagram of a first exemplary embodiment of distribution of the processing steps for the fraud detection process. As shown in steps 802a-812a of FIG. 8A, video of the user's face is captured by software installed on mobile computing device 102 on a user's device and transmitted to server computing device 107 via network 106, where the detection of facial features, time-series signal generation, features extraction, and fraud detection classification of the video occurs. This embodiment requires that the video is small enough in terms of file size to be feasible to send in a small amount of time and reasonable data cost on standard consumer mobile networks, while the video is of good enough quality for reliable facial landmark extraction.

Figure 8C:
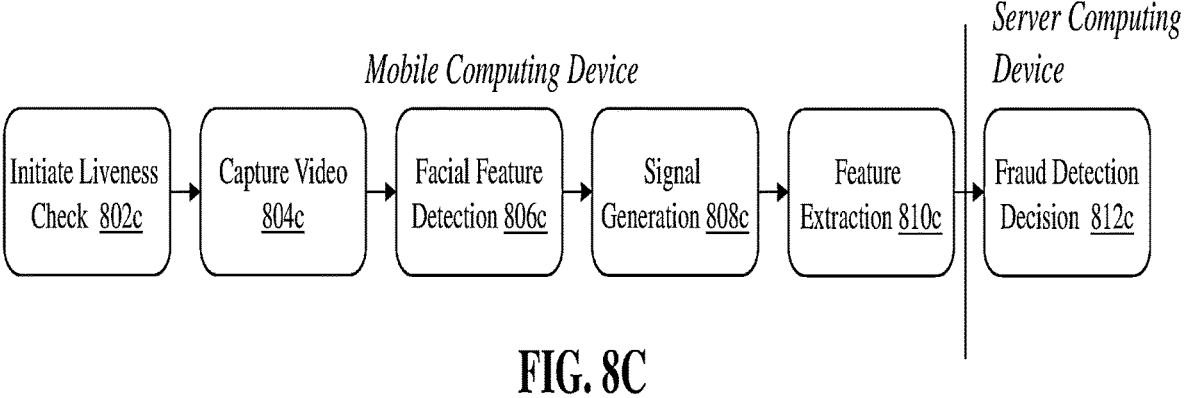
FIG. 8C is a flow diagram of a third exemplary embodiment of distribution of the processing steps for the fraud detection process.

FIG. 8B is a flow diagram of a second exemplary embodiment of distribution of the processing steps for the fraud detection process. In this embodiment (steps 802b-812b of FIG. 8B), mobile computing device 102 captures the video of the user's face and also performs the facial recognition, and signal generation steps described above. Then, mobile computing device 102 only transmits the generated time-series signals to server computing device 107 for feature extraction and fraud detection determination by fraud detection module 108c and ML classification model 109. FIG. 8C is a flow diagram of a third exemplary embodiment of distribution of the processing steps for the fraud detection process. In this embodiment (steps 802c-812c of FIG. 8C), mobile computing device 102 captures the video of the user's face and also performs the facial recognition, signal generation, and feature extraction steps described above. Then, mobile computing device 102 only transmits the extracted classification features to server computing device 107 for analysis by fraud detection module 108c and ML classification model 109. The above second and third embodiments require larger processing power in the mobile computing device to perform facial feature landmark detection, signal generation, and/or feature extraction, but can operate in situations with greater privacy requirements as only extracted features or time-series signals are sent to the server computing device-thereby minimizing risk that the video of the user's face is intercepted during transmission via network 106. Also, in some embodiments, data transfer between mobile computing device 102 and server computing device 107 is encrypted to prevent malicious actors from understanding or using the video data.

Figure 8D:
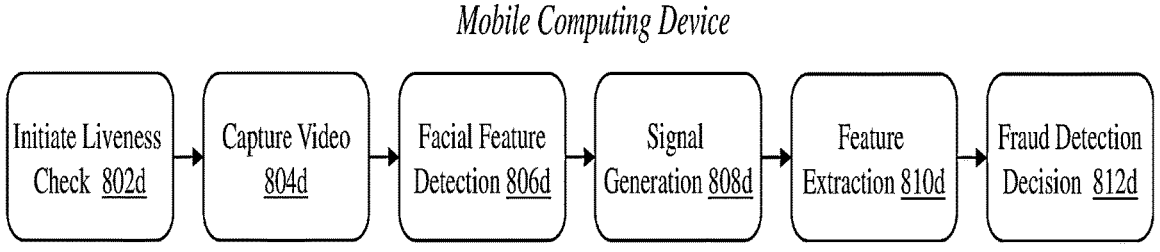
FIG. 8D is a flow diagram of a fourth exemplary embodiment of distribution of the processing steps for the fraud detection process.

FIG. 8D is a flow diagram of a fourth exemplary embodiment of distribution of the processing steps for the fraud detection process. In this embodiment, mobile computing device 102 can perform the complete process described with respect to FIG. 2, namely video capture, facial detection, time-series signal generation, feature extraction and fraud detection determination—as shown in steps 802d-812d of FIG. 8D. This embodiment requires additional processing power in the mobile computing device as well as increased storage for the classification model 109. However, this embodiment enables operation of the fraud detection process in environments with extremely high privacy requirements or in areas with no network coverage—because no data needs to be transmitted to server computing device 107 in order to render a fraud detection decision.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, smartphone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing devices include, for example, iOS™-based devices such as the iPhone™ and iPad™ available from Apple, Inc., and Android™-based devices such as the Galaxy™ available from Samsung Corp., the Pixel™ available from Google, Inc., and the Kindle Fire™ available from Amazon, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computer system for detecting fraud during identity verification, the system comprising a mobile computing device coupled to an image capture device and a server computing device, the mobile computing device configured to:

capture, using the image capture device, video comprising a plurality of frames of a person's face; and transmit the plurality of frames to the server computing device;

the server computing device configured to:

detect a location of one or more facial features of the person's face in each of the plurality of frames, wherein the facial features comprise rigid facial features and non-rigid facial features;

generate a plurality of time-series signals representing the relative movement of the facial features based on the detected location of the facial features in each of the plurality of frames;

extract one or more classification features from the plurality of time-series signals; and apply a trained machine learning classification model to the extracted classification features to generate a fraud detection decision for the plurality of frames based on whether the classification features are indicative of genuine facial movement.

2. The system of claim 1, wherein the mobile computing device transmits the plurality of frames to the server computing device upon determining that a threshold number of frames contain the person's face.

3. The system of claim 1, wherein the server computing device applies a facial landmark regression algorithm to each of the plurality of frames to detect the location of the one or more facial features of the person's face.

4. The system of claim 3, wherein the non-rigid facial features comprise irises, eyelids, eyebrows, eye corners, and mouth.

5. The system of claim 4, wherein the rigid facial features comprise face outline and nose.

6. The system of claim 1, wherein generating the plurality of time-series signals representing the relative movement of facial features based on the detected location of the facial features in each of the plurality of frames comprises:

calculating a relative position between the location of each non-rigid facial feature and the location of one or more of the rigid facial features across the plurality of frames; and generating the plurality of time-series signals based upon the relative positions.

7. The system of claim 1, wherein generating the plurality of time-series signals representing the relative movement of facial features based on the detected location of the facial features in each of the plurality of frames comprises:

generating an edge image for each of the plurality of frames;

measuring, in each edge image, a dynamic intensity value of one or more edge pixels associated with the non-rigid facial features;

determining, in each edge image, a static intensity value of one or more edge pixels associated with the rigid facial features; and generating the plurality of time-series signals based upon a relative intensity value between the dynamic intensity value and the static intensity value across the plurality of edge images.

8. The system of claim 1, wherein generating the plurality of time-series signals representing the relative movement of facial features based on the detected location of the facial features in each of the plurality of frames comprises:

measuring an optical flow value for each pixel in each of the plurality of frames;

calculating a dynamic motion value for one or more pixels associated with the non-rigid facial features;

calculating a static motion value for one or more pixels associated with the rigid facial features; and generating the plurality of time-series signals based upon a relative motion value between the dynamic motion value and the static motion value across the plurality of frames.

9. The system of claim 1, wherein extracting one or more classification features from the plurality of time-series signals comprises:

determining one or more statistical attributes of the plurality of time-series signals; and generating the one or more classification features based upon the statistical attributes.

10. The system of claim 9, wherein the one or more statistical attributes comprise one or more moments of the time-series signal distribution, one or more temporal measurements of the time-series signal, and one or more correlation coefficients between the time-series signal and one or more pose measurements of the person's face.

11. The system of claim 1, wherein extracting one or more classification features from the plurality of time-series signals comprises:

selecting two or more sequential samples from the time-series signal; and generating the classification features based upon the two or more sequential samples.

12. The system of claim 11, wherein applying the trained machine learning classification model to the extracted classification features to generate the fraud detection decision for the plurality of frames based on whether the classification features are indicative of genuine facial movement comprises:

applying the trained machine learning classification model using the classification features based upon the two or more sequential samples to generate a partial fraud detection score associated with a portion of the video corresponding to the two or more sequential samples;

generating additional classification features based upon additional sequential samples from the time-series signal and applying the trained machine learning classification model using the additional classification features to generate a partial fraud detection score associated each portion of the video corresponding to the additional sequential samples;

calculating an overall fraud detection score for the video based upon the partial fraud detection scores; and generating the fraud detection decision based upon the overall fraud detection score.

13. The system of claim 1, wherein extracting one or more classification features from the plurality of time-series signals comprises:

selecting two or more sequential samples from the time-series signal that correspond to a time of a first user interface event generated during video capture; and generating the classification features based upon the two or more sequential samples.

14. The system of claim 13, wherein applying the trained machine learning classification model to the extracted classification features to generate the fraud detection decision for the plurality of frames based on whether the classification features are indicative of genuine facial movement comprises applying the trained machine learning classification model using the classification features based upon the two or more sequential samples to generate a partial fraud detection score associated with a portion of the video corresponding to the two or more sequential samples;

generating additional classification features based upon additional sequential samples from the time-series signal that correspond to a time of one or more other user interface events generated during video capture;

applying the trained machine learning classification model using the additional classification features to generate a partial fraud detection score associated each portion of the video corresponding to the additional sequential samples;

calculating an overall fraud detection score for the video based upon the partial fraud detection scores; and generating the fraud detection decision based upon the overall fraud detection score.

15. The system of claim 1, wherein the server computing device trains a machine learning classification model using the extracted classification features as input to create the trained machine learning classification model.

16. The system of claim 1, wherein the server computing device transmits the fraud detection decision to the mobile computing device for display.

17. The system of claim 1, wherein the server computing device transmits the fraud detection decision to a remote computing device for display to a user of the remote computing device.

18. The system of claim 1, wherein the server computing device continuously generates the fraud detection decision for the plurality of frames during video capture.

19. The system of claim 1, wherein the server computing device determines that the captured video comprises enough frames to enable the server computing device to compute a fraud detection decision prior to stopping the video capture.

20. The system of claim 19, wherein the mobile computing device restarts the video capture when the mobile computing device determines that the captured video does not comprise enough frames to enable the server computing device to compute a fraud detection decision.

21. The system of claim 1, wherein the mobile computing device generates one or more visual elements for display on the mobile computing device during video capture.

22. The system of claim 21, wherein the one or more visual elements are randomly generated during video capture.

23. The system of claim 22, wherein the one or more visual elements include random visual features, random spatial movements, appearances at random times during video capture, disappearances at random times during video capture, appearances at random display locations on the mobile computing device, or disappearances from random display locations on the mobile computing device.

24. A computerized method of detecting fraud during identity verification, the method comprising:

capturing, using an image capture device of a mobile computing device, video comprising a plurality of frames of a person's face;

transmitting, by the mobile computing device, the plurality of frames to a server computing device;

detecting, by the server computing device, a location of one or more facial features of the person's face in each of the plurality of frames, wherein the facial features comprise rigid facial features and non-rigid facial features;

generating, by the server computing device, a plurality of time-series signals representing the relative movement of the facial features based on the detected location of the facial features in each of the plurality of frames;

extracting, by the server computing device, one or more classification features from the plurality of time-series signals; and applying, by the server computing device, a trained machine learning classification model to the extracted classification features to generate a fraud detection decision for the plurality of frames based on whether the classification features are indicative of genuine facial movement.

25. The method of claim 24, wherein the mobile computing device transmits the plurality of frames to the server computing device upon determining that a threshold number of frames contain the person's face.

26. The method of claim 24, wherein the server computing device applies a facial landmark regression algorithm to each of the plurality of frames to detect the location of the one or more facial features of the person's face.

27. The method of claim 26, wherein the non-rigid facial features comprise irises, eyelids, eyebrows, eye corners, and mouth.

28. The method of claim 27, wherein the rigid facial features comprise face outline and nose.

29. The method of claim 24, wherein generating the plurality of time-series signals representing the relative movement of the facial features based on the detected location of the facial features in each of the plurality of frames comprises:

calculating a relative position between the location of each non-rigid facial feature and the location of one or more of the rigid facial features across the plurality of frames; and generating the plurality of time-series signals based upon the relative positions.

30. The method of claim 24, wherein generating the plurality of time-series signals representing the relative movement of the facial features based on the detected location of the facial features in each of the plurality of frames comprises:

generating an edge image for each of the plurality of frames;

measuring, in each edge image, a dynamic intensity value of one or more edge pixels associated with the non-rigid facial features;

determining, in each edge image, a static intensity value of one or more edge pixels associated with the rigid facial features; and generating the plurality of time-series signals based upon a relative intensity value between the dynamic intensity value and the static intensity value across the plurality of edge images.

31. The method of claim 24, wherein generating the plurality of time-series signals representing the relative movement of the facial features based on the detected location of the facial features in each of the plurality of frames comprises:

measuring an optical flow value for each pixel in each of the plurality of frames;

calculating a dynamic motion value for one or more pixels associated with the non-rigid facial features;

calculating a static motion value for one or more pixels associated with the rigid facial features; and generating the plurality of time-series signals based upon a relative motion value between the dynamic motion value and the static motion value across the plurality of frames.

32. The method of claim 24, wherein extracting one or more classification features from the plurality of time-series signals comprises:

determining one or more statistical attributes of the plurality of time-series signals; and generating the one or more classification features based upon the statistical attributes.

33. The method of claim 32, wherein the one or more statistical attributes comprise one or more moments of the time-series signal distribution, one or more temporal measurements of the time-series signal, and one or more correlation coefficients between the time-series signal and one or more pose measurements of the person's face.

34. The method of claim 24, wherein extracting one or more classification features from the plurality of time-series signals comprises:

selecting two or more sequential samples from the time-series signal; and generating the classification features based upon the two or more sequential samples.

35. The method of claim 34, wherein applying the trained machine learning classification model to the extracted classification features to generate the fraud detection decision for the plurality of frames based on whether the classification features are indicative of genuine facial movement comprises:

applying the trained machine learning classification model using the classification features based upon the two or more sequential samples to generate a partial fraud detection score associated with a portion of the video corresponding to the two or more sequential samples;

generating additional classification features based upon additional sequential samples from the time-series signal and applying the trained machine learning classification model using the additional classification features to generate a partial fraud detection score associated each portion of the video corresponding to the additional sequential samples;

calculating an overall fraud detection score for the video based upon the partial fraud detection scores; and generating the fraud detection decision based upon the overall fraud detection score.

36. The method of claim 24, wherein extracting one or more classification features from the plurality of time-series signals comprises:

selecting two or more sequential samples from the time-series signal that correspond to a time of a first user interface event generated during video capture; and generating the classification features based upon the two or more sequential samples.

37. The method of claim 36, wherein applying the trained machine learning classification model to the extracted classification features to generate the fraud detection decision for the plurality of frames based on whether the classification features are indicative of genuine facial movement comprises:

applying the trained machine learning classification model using the classification features based upon the two or more sequential samples to generate a partial fraud detection score associated with a portion of the video corresponding to the two or more sequential samples;

generating additional classification features based upon additional sequential samples from the time-series signal that correspond to a time of one or more other user interface events generated during video capture;

applying the trained machine learning classification model using the additional classification features to generate a partial fraud detection score associated each portion of the video corresponding to the additional sequential samples;

calculating an overall fraud detection score for the video based upon the partial fraud detection scores; and generating the fraud detection decision based upon the overall fraud detection score.

38. The method of claim 24, wherein the server computing device trains a machine learning classification model using the extracted classification features as input to create the trained machine learning classification model.

39. The method of claim 24, wherein the server computing device transmits the fraud detection decision to the mobile computing device for display.

40. The method of claim 24, wherein the server computing device transmits the fraud detection decision to a remote computing device for display to a user of the remote computing device.

41. The method of claim 24, wherein the server computing device continuously generates the fraud detection decision for the plurality of frames during video capture.

42. The method of claim 24, wherein the server computing device determines that the captured video comprises enough frames to enable the server computing device to compute a fraud detection decision prior to stopping the video capture.

43. The method of claim 42, wherein the mobile computing device restarts the video capture when the mobile computing device determines that the captured video does not comprise enough frames to enable the server computing device to compute a fraud detection decision.

44. The method of claim 24, wherein the mobile computing device generates one or more visual elements for display on the mobile computing device during video capture.

45. The method of claim 44, wherein the one or more visual elements are randomly generated during video capture.

46. The method of claim 45, wherein the one or more visual elements include random visual features, random spatial movements, appearances at random times during video capture, disappearances at random times during video capture, appearances at random display locations on the mobile computing device, or disappearances from random display locations on the mobile computing device.

\* \* \* \* \*